United States Patent
Kim et al.

(10) Patent No.: US 10,477,284 B2
(45) Date of Patent: Nov. 12, 2019

(54) WATERMARK EMBEDDING METHOD AND APPARATUS, AND SYSTEM

(71) Applicant: MARKANY INC., Seoul (KR)

(72) Inventors: So Won Kim, Seoul (KR); Tai Yoon Lee, Seoul (KR); Min Soo Park, Uiwang-si (KR); Ji Seop Moon, Seoul (KR); Dong Hwan Shin, Seoul (KR)

(73) Assignee: MARKANY INC., Seoul (KR)

( * ) Notice: Subject to any disclaimer, the term of this patent is extended or adjusted under 35 U.S.C. 154(b) by 0 days.

(21) Appl. No.: 15/434,065

(22) Filed: Feb. 16, 2017

(65) Prior Publication Data

US 2018/0211354 A1    Jul. 26, 2018

(30) Foreign Application Priority Data

Jan. 26, 2017    (KR) .................. 10-2017-0012401

(51) Int. Cl.
    *G06T 1/00*    (2006.01)
    *H04N 21/8358*    (2011.01)

(52) U.S. Cl.
    CPC ....... *H04N 21/8358* (2013.01); *G06T 1/0028* (2013.01); *G06T 2201/0051* (2013.01); *G06T 2201/0202* (2013.01)

(58) Field of Classification Search
    None
    See application file for complete search history.

(56) References Cited

U.S. PATENT DOCUMENTS

| | | | |
|---|---|---|---|
| 2013/0028465 A1* | 1/2013 | Kuraki | G06T 1/0085 382/100 |
| 2015/0154725 A1* | 6/2015 | Kuraki | G06T 1/0064 382/100 |

OTHER PUBLICATIONS

Lee et al., "Video Watermarking on Overlay Layer," 2011, 7th International Conference on Intelligent Information Hiding and Multimedia Signal Processing (Year: 2011).*
Garg et al. "Chaotic Map Based Steganography of Gray Scale Images in Wavelet Domain," 2014 International Conference on Signal Processing and Integrated Networks (SPIN) (Year: 2014).*
Jagga et al., "Secure Digital Image Steganography," International Journal of Soft Computing and Engineering (IJSCE), vol. 4, No. 3, Jul. 2014 (Year: 2014).*

* cited by examiner

*Primary Examiner* — Soo Shin
(74) *Attorney, Agent, or Firm* — Envision USA Inc.

(57) ABSTRACT

Disclosed is a watermark embedding method. The method includes receiving an original image, generating a watermark image based on the selected watermark pattern, generating an alpha blended stego image by alpha blending the original image and the watermark image, and providing the alpha blended stego image, in which the watermark image is generated by considering at least one of allowable pixel value range and alpha value α range of the watermark pattern applied to a first pixel of the original image, wherein the at least one of allowable pixel value range and alpha value α range are determined by the difference of pixel value of the first pixel between the original image and the stego image by embedding the watermark pattern to the first pixel.

14 Claims, 21 Drawing Sheets

FIG. 5

| +3 | +4 | -1 |
|----|----|----|
| -2 | +5 | -6 |
| +2 | -1 | -4 | d VALUE IS VARIABLE

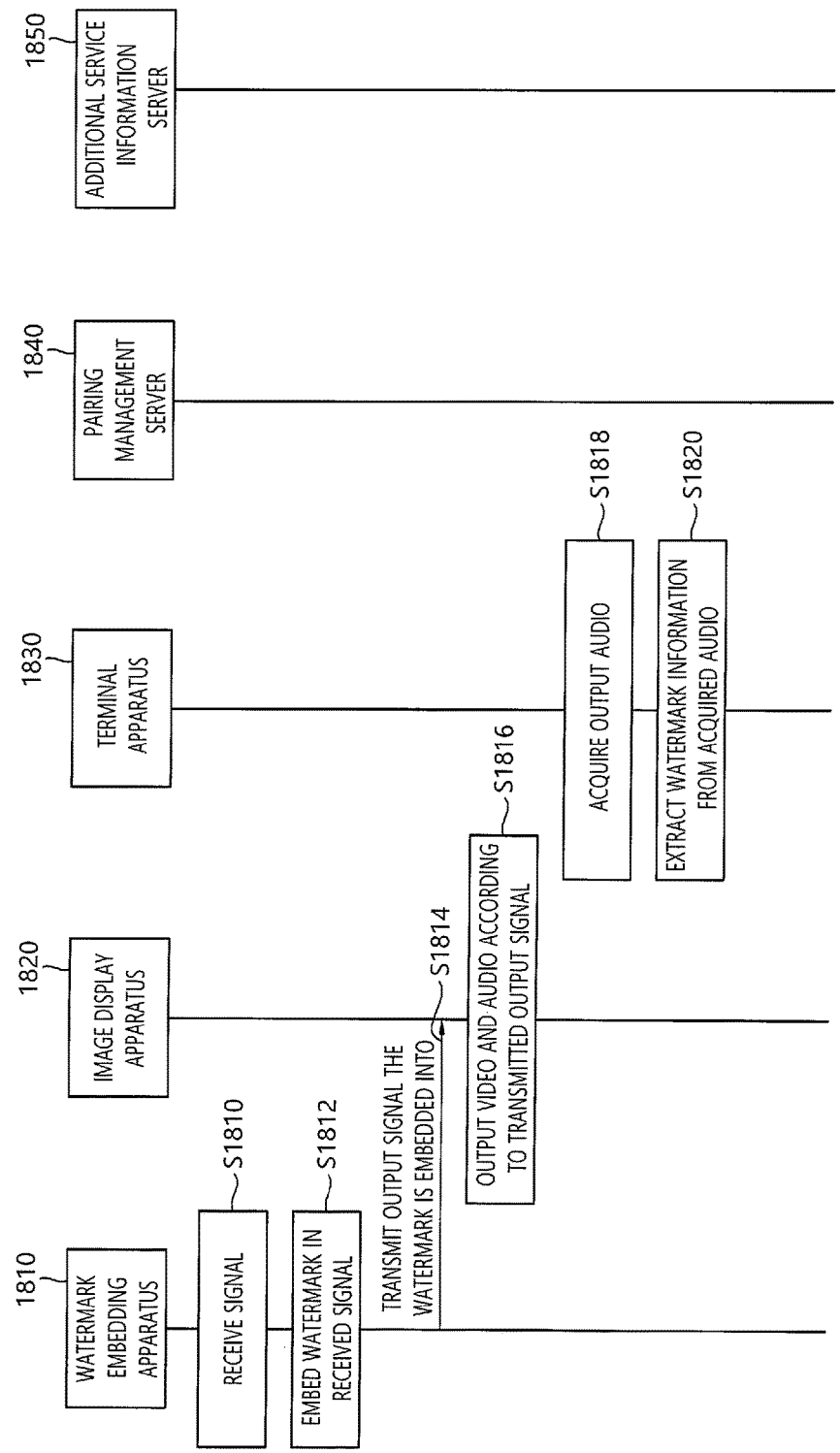

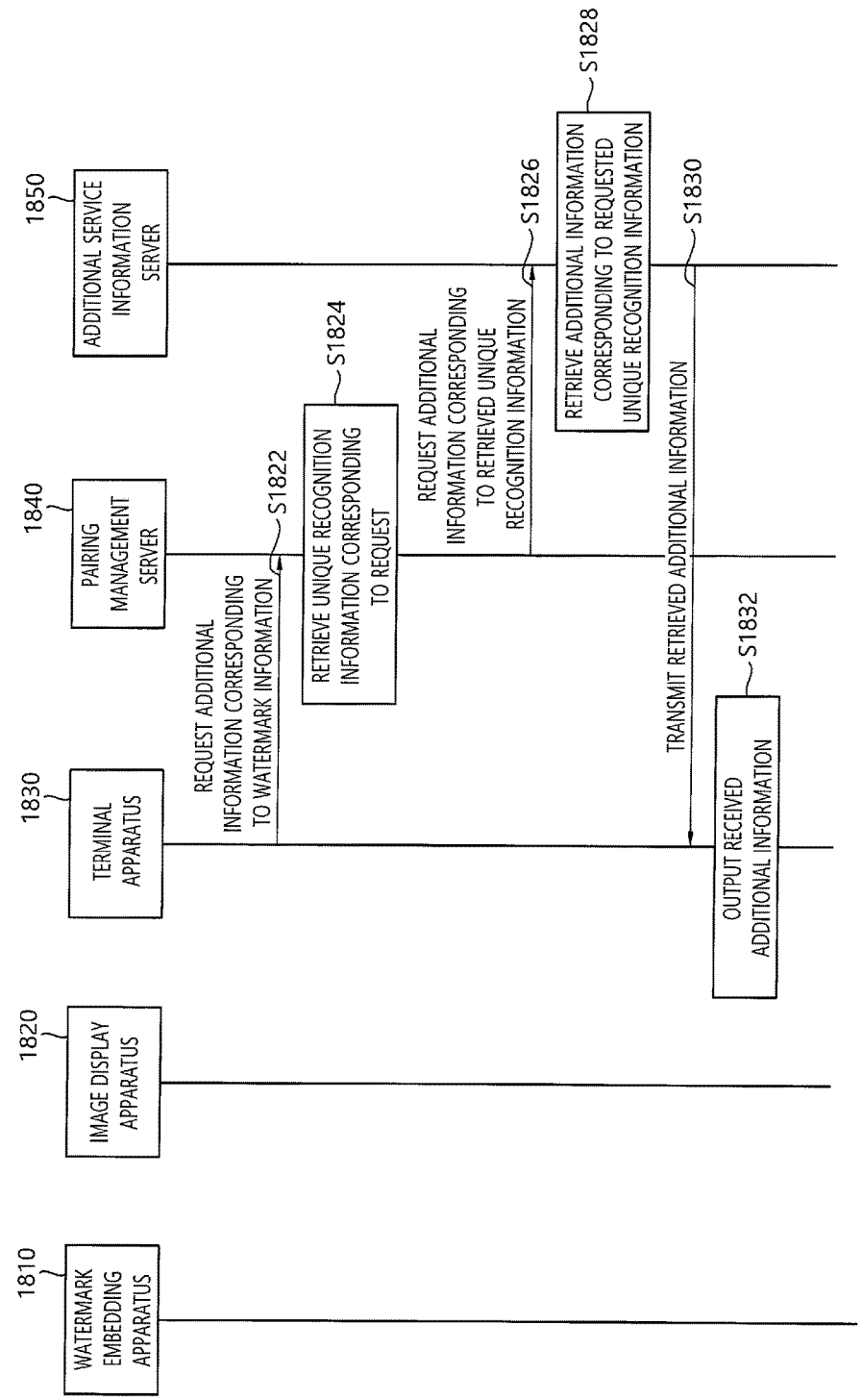

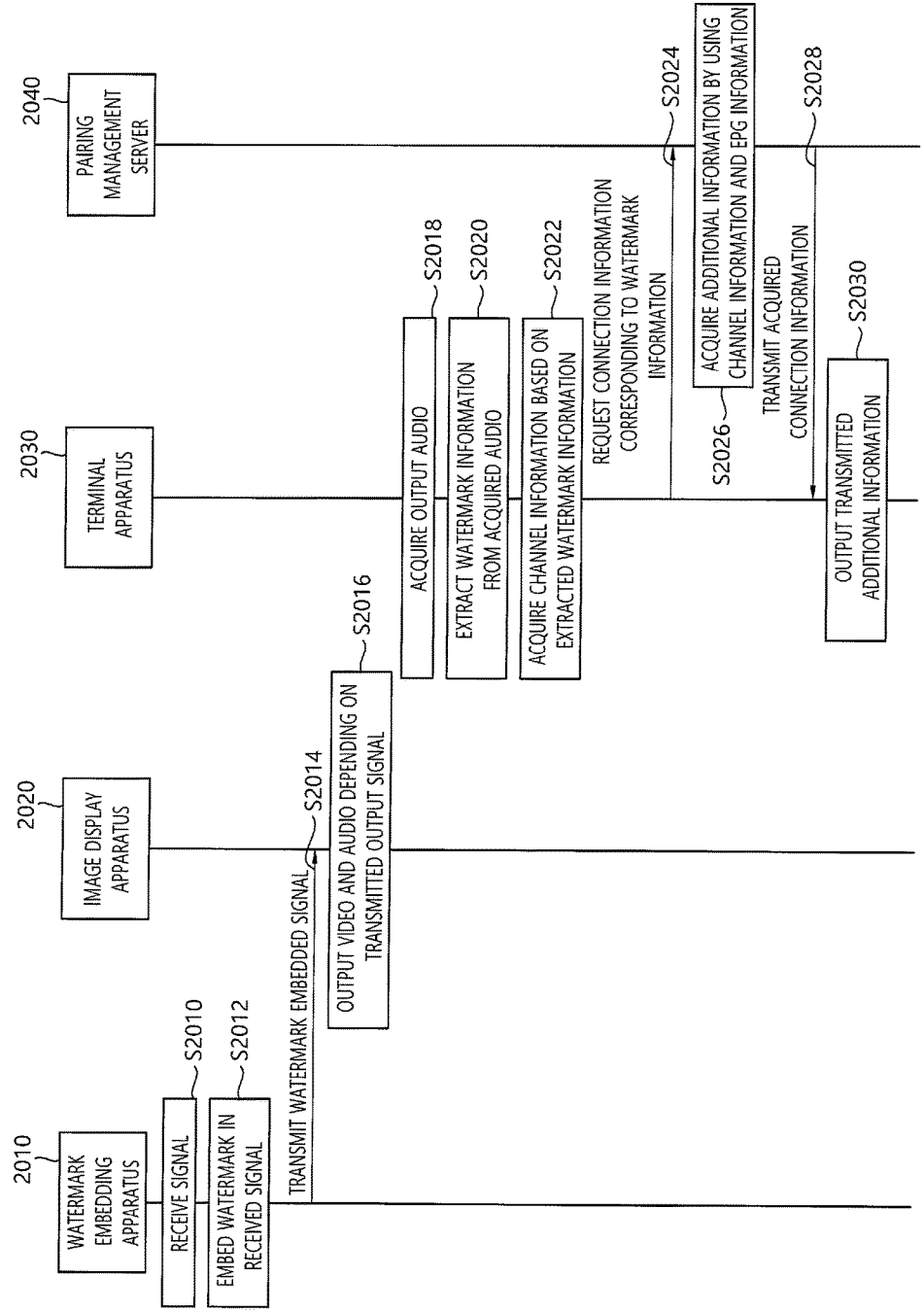

WATERMARK EMBEDDING METHOD AND APPARATUS, AND SYSTEM

CROSS-REFERENCE TO RELATED APPLICATIONS

This application claims the benefit of priority of Korean Patent Application No. 10-2017-0012401 filed on Jan. 26, 2017, which is incorporated by reference in its entirety herein.

This work was supported by Institute for Information & communications Technology Promotion (IITP) grant funded by the Korea government (MSIP) (No. B0126-16-1002, Development of smart broadcast service platform based on semantic cluster to build an open-media ecosystem).

BACKGROUND OF THE INVENTION

Field of the Invention

The present invention relates to a watermark embedding method, and more particularly, to a method for performing alpha blending by embedding a watermark into a video signal and a method for embedding watermarks into a video signal and an audio signal.

Discussion of the Related Art

Since digital media are inexpensive and easy to use media and maintain the quality of the media, digital display, storage, distribution and copying of the digital media have been significantly universalized. However, such an advantage enables widespread illegal distribution and use of copyrighted data, such as unauthorized distribution of digital images and videos over the Internet.

Multiple different schemes have been proposed to protect the digital media against unauthorized use. For example, digital encryption technology is effective to enable security communication and transmission. However, when encrypted contents are decrypted or expressed in a format in which the encrypted contents can be viewed or heard by human, the contents may be rewritten and a copy of which the security is cancelled may be acquired.

When the media is marked by embedding receiver information in the media, it is possible to help identifying individuals using the contents by receiving the media by an unauthorized method. Further, ownership information embedded in the media may indicate copy restriction and clarify an ownership of the media.

As one of the methods, digital marking is provided. Multiple digital watermarking methods which are frequently used includes a procedure of embedding a digital bit sequence in the digital media by applying machine readable manipulation to a specific location in a time or space. During the reading, software is used for analyzing the manipulation the digital bit sequence used for assembly of an embedded message. Knowledge of the location of the manipulation in the space or time is required for analyzing the manipulation. When the manipulation is distorted (that is, for example, wrongly positioned or weakened), reading (alternatively, designated even as detection) occasionally becomes difficult or impossible. The distortion may occur during brief media handling such as cropping, rotation, conversion into another file format, and modification of frame rate. Further, in order to remove a mark, intentional misplacement of the manipulation may be applied by an attacker and the intentional misplacement of the manipulation may occur slight unperceptual combined distortion such as shift, rotation, and a change of a play speed. A publicly available applies a part of the manipulation designated even as an attack in an automated mode. A current digital watermarking algorithm may not be strong enough to perceive (also processing designated as registration) misplacement in distorted contents. As a result, the intentional misplacement may make it impossible to read a digital watermark.

In particular, further, a process of the digital watermarking may conventionally accompany complicated deformation of an original image and an image to be embedded and examples of the complicated deformation include alpha blending, DCT conversion, and the like. Since a calculation required for performing the deformation is a process requiring much time, there is significant restriction at the time of embedding the digital watermark in real time (for example, during playing or downloading) and moreover, the watermarking method is configured by firmly determined modified contents, and as a result, the watermarking method cannot have flexibility to a change for adopting different compression formats, securities, or performance conditions. Accordingly, in an apparatus that performs alpha blending, the watermark loses a function thereof or remarkably degrades an image quality of a media image to cause convenience of a user.

Further, in recent years, as a digital TV service using a wired or wireless communication network in addition to a broadcast signal transmitted in a broadcasting station has been universalized, better image quality and sound quality than a service depending on the existing analog broadcast signal are provided and various additional services are provided and the digital TV service may be provided through broadcasting services provided by various content providers as well as the broadcast signal transmitted from the broadcasting station.

In particular, users who use a cable TV, an IPTV, and the like use the digital TV through a settop box. The digital TV using the settop box receives an image signal and an audio signal from the settop box and outputs the received image signal and audio signal to provide the digital TV service. In particular, when the settop box is used, since the digital TV performs only a monitor function, the digital TV receives the image signal, the audio signal, and additional service information from the settop box and an additional information signal provided by the broadcasting station may not be transferred to the digital TV while passing through the settop box, and as a result, various additional services provided to the digital TV service cannot be normally used.

Further, in order to use pairing between the digital TV and a portable device such as a smart phone, since only the smart phone registered in the settop box needs to be used, it is difficult to use various additional services by a smart phone which is not registered.

Meanwhile, in order to provide various additional services associated with the digital TV, when the watermark is directly embedded in the transmitted broadcast signal, an error may occur in a broadcasting system and the broadcast may be degraded. Therefore, there is even a problem in that the broadcasting station or content providers avoid inserting the watermark in the broadcast signal.

SUMMARY OF THE INVENTION

An object of the present invention is to provide a method for performing watermark alpha blending, which allows a watermark pattern to be appropriately embedded in spite of an influence of an alpha value, and the like.

Another object of the present invention is to provide a watermark embedding system which recognizes various information included in an input signal, provides various additional services associated with output contents, and allows a watermark embedding apparatus and a portable terminal to be easily connected with each other.

Yet another object of the present invention is to provide a watermark embedding method and a watermark embedding apparatus which embed a watermark in an image and an audio output without degradation of a broadcast signal or an error of a broadcasting system.

In accordance with an embodiment of the present invention, a method may include receiving an original image, generating a watermark image based on the selected watermark pattern, generating an alpha blended stego image by alpha blending the original image and the watermark image, and providing the alpha blended stego image, in which the watermark image may be generated by considering at least one of allowable pixel value range and alpha value α range of the watermark applied to a first pixel of the original image wherein the at least one of allowable pixel value range and alpha value α ranges are determined by the difference of pixel value of the first pixel between the original image pixel value and the stego image pixel value by embedding the watermark pattern to the first pixel.

The watermark image may be generated by considering at least one of allowable pixel value range and alpha value α range of the watermark pattern applied to the first pixel based on a variation d1−d2 between a difference d1 in pixel value between the first pixel and the correlation pixel in the original image and a difference d2 in pixel value between the first pixel and the correlation pixel in the stego image by embedding the watermark pattern to the first pixel in a relationship between the first pixel and the correlation pixel having a temporal-spatial correlation.

When considering a first correlation pixel and a second correlation pixel temporal-spatially correlated with the first pixel, the watermark image may be generated based on a watermark pixel value and an alpha value which simultaneously satisfy (i) at least one of allowable pixel value range and alpha value α range of the watermark pattern applied to the first pixel based on a first variation of the pixel value difference between the first pixel and the first correlation pixel by embedding the watermark pattern in the first pixel; and ii) at least one of allowable pixel value range and alpha value α range of the watermark pattern applied to the first pixel based on a second variation of the pixel value difference between the first pixel and the second correlation pixel by embedding the watermark pattern in the first pixel.

The difference d between the pixel values or the variation d1−d2 according to the embedding of the watermark pattern may be selected as the largest difference value among a plurality of variations of the pixel values in the stego image according to the change of the pixel values in the original image.

The difference d between the pixel values or the variation d1−d2 according to the embedding of the watermark pattern may be acquired based on the difference value between the pixels by considering the number of cases of all watermark pattern values which are applicable to any original image pixel value.

The allowable pixel value range and alpha value range based on the difference d between the pixel values or the variation d1−d2 according to the embedding of the watermark pattern may be calculated based on an alpha blending map which defines at least one of the allowable watermark pixel value range and alpha value changed with the correlation as the pixel value of the original image is changed in response to the difference d between the pixel values or the variation d1−d2.

The alpha blending map may be implemented by including at least one graph line representing the watermark pixel value range and alpha value α range according to the difference d between the pixel values or the variation d1−d2.

The alpha blending map may include the at least one graph line expressed by defining the difference d between the pixel values or the variation d1−d2 as a specific interval, and the watermark pixel value range according to the difference value d between the pixel values or the variation d1−d2 which is not included in the specific interval may be calculated by using a distance from the at least one graph line of.

The alpha blending map may be implemented by at least on of equations, tables, and graphs.

The alpha blending map may be predetermined.

The pattern value of the watermark pattern may have a value expressed by at least one number and each value may be classified into a higher value than an average in the watermark pattern and a lower value than the average.

The pattern value of the watermark pattern may have a weight and the difference value d between the pixel values or the variation d1−d2 may be changed according to the weight.

The alpha blending may be performed by generating the watermark image regardless of the pixel values of the pixels in a current input image.

In accordance with another embodiment of the present invention, a watermark embedding apparatus may include an image input unit receiving a current input image, a watermark pattern selection unit selecting a watermark pattern to be embedded in the current input image, an image generating unit generating a watermark image based on the selected watermark pattern, an alpha blending performing unit generating an alpha blended stego image by alpha blending the current input image and the watermark image, and an image providing unit providing the alpha blended stego image, in which the watermark image generating unit generates the watermark image by considering at least one of allowable pixel value range and alpha value α range of the watermark applied to a first pixel of the original image wherein the at least one of allowable pixel value range and alpha value α ranges are determined by the difference of pixel value of the first pixel between the original image pixel value and the stego image pixel value by embedding the watermark pattern to the first pixel.

The watermark image generating unit may generate the watermark image by considering at least one of allowable pixel value range and alpha value α range of the watermark applied to the first pixel based on a variation d1−d2 between a difference d1 in pixel value between the first pixel and the correlation pixel in the original image and a difference d2 in pixel value between the first pixel and the correlation pixel in the stego image by embedding the watermark pattern to the first pixel in a relationship between the first pixel and the correlation pixel having a temporal-spatial correlation.

In accordance with yet another embodiment of the present invention, a watermark embedding method may include receiving an input signal, embedding a watermark including unique recognition information in at least one of a video signal and an audio signal included in the input signal, and outputting the video signal and the audio signal embedded with the watermark, in which the embedding of the watermark may include embedding a watermark including at least one of identification (ID) information of a receiving apparatus, pairing information for communicating with the receiving apparatus, and broadcast channel information on a broadcast channel output from the receiving apparatus.

In accordance with still another embodiment of the present invention, a watermark embedding apparatus may include a receiving apparatus receiving an input signal, a control unit embedding a watermark including unique recognition information in at least one of a video signal and an audio signal included in the input signal, and an output unit outputting the video signal and the audio signal embedded with the watermark, in which the watermark embedding apparatus may embed a watermark including at least one of ID information of an apparatus, pairing information for communicating with the apparatus, and broadcast channel information on a broadcast channel output from the apparatus.

In accordance with still yet another embodiment of the present invention, an operation method of a terminal apparatus interoperating with an watermark embedding apparatus may include acquiring video and audio signals generated by embedding a watermark including unique recognition information in at least one of a video signal and an audio signal included in an input signal received from the watermark embedding apparatus, from the watermark embedding apparatus or other apparatuses, extracting a watermark included in at least one of the acquired video and audio signals, and requesting additional information corresponding to the extracted watermark.

The watermark may include at least one of ID information of the watermark embedding apparatus, pairing information for pairing with the watermark embedding apparatus, and channel information to be output according to the input signal.

The additional information may include at least one of broadcast services related to video and audio signals, information related to contents, goods and advertisement information.

Based on the unique recognition information included in the watermark, an additional information request signal including the extracted watermark may be transmitted to the pairing management server.

The pairing management server may retrieve unique recognition information of the watermark embedding apparatus based on the additional information request signal to request additional information corresponding to the watermark embedding apparatus and retrieve the additional information corresponding to the unique recognition information of the watermark embedding apparatus to provide the additional information to the terminal apparatus.

The terminal apparatus may perform a pairing operation for communicating with the watermark embedding apparatus based on the pairing information included in the watermark.

The terminal apparatus may request additional information corresponding to the channel information to the additional service server based on the channel information included in the watermark.

The terminal apparatus may receive channel information and electronic program guide (EPG) information in response to the request.

The request of the additional information corresponding to the extracted watermark may be automatically performed according to the extraction of the watermark.

The terminal apparatus may acquire video and audio signals including the watermark through at least one of a camera and a microphone.

In accordance with still yet another embodiment of the present invention, a system of embedding and extracting a watermark may include a watermark embedding apparatus which receives an image signal and embeds a watermark including unique recognition information in at least one of a video signal and an audio signal included in the received input signal, an image display apparatus that outputs video and audio by receiving at least one of the video signal and the audio signal embedded with the watermark, and a terminal apparatus which extracts the watermark included in at least one of the output video and audio and acquires information corresponding to the extracted watermark.

In a watermark embedding method and a watermark embedding apparatus according to embodiments of the present invention, even though an apparatus that receives an input image and provides the received image to a receiver or directly outputs the image performs alpha blending, robustness of a watermark pattern is enhanced and the watermark pattern is prevented from being degenerated during such a process.

Further, in a watermark embedding method and a watermark embedding apparatus according to another embodiments of the present invention, various information depending on a broadcast signal can be provided, various additional services associated with output contents can be provided, a broadcast receiving device and a portable terminal can be connected to easily communicate with each other, and a watermark is efficiently embedded in an image or an audio output without degradation of a broadcast signal or an error of a broadcasting system.

BRIEF DESCRIPTION OF THE DRAWINGS

FIG. 5 is a conceptual view illustrating a configuration of a pattern in which a weight is added to a watermark pattern according to another embodiment of the present invention;

FIGS. 18A and 18B are flowcharts illustrating an operation method of a watermark embedding system according to another embodiment of the present invention;

FIG. 20 is a flowchart illustrating an additional information providing method according to an embodiment of the present invention.

DETAILED DESCRIPTION OF THE EMBODIMENTS

Figure 1:
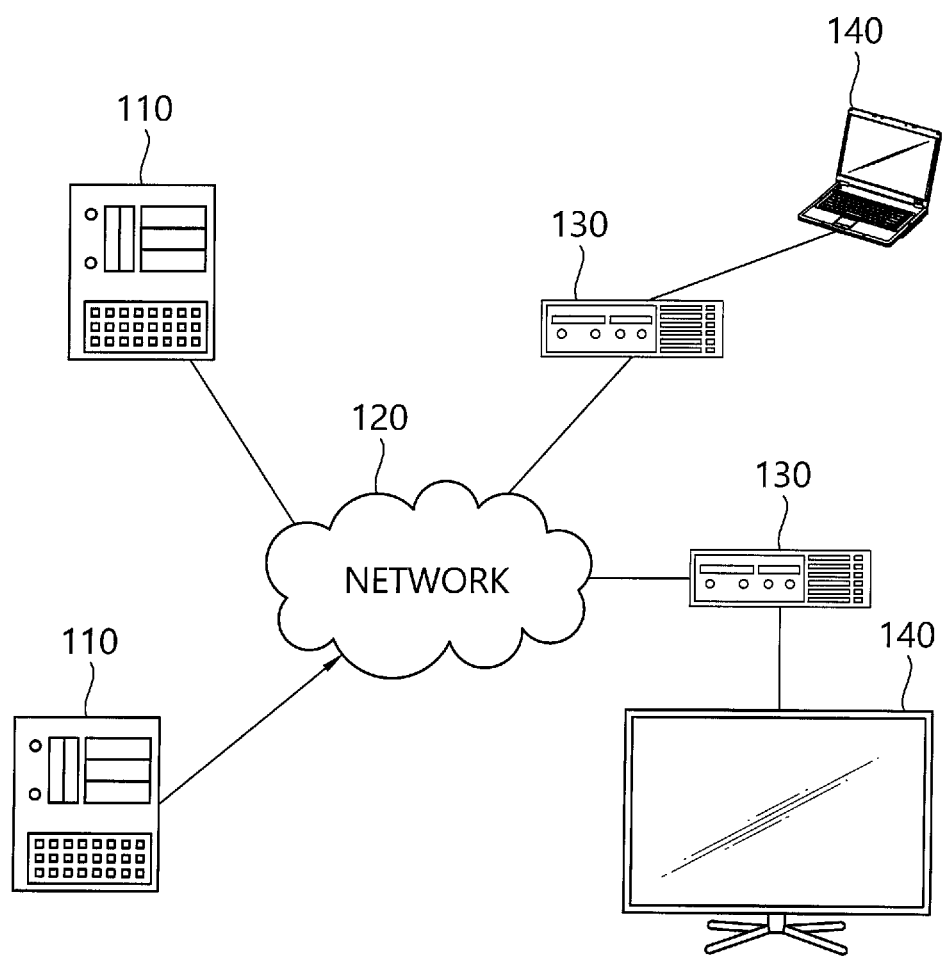
FIG. 1 is a block diagram schematically illustrating a system to which a watermark embedding method according to an embodiment of the present invention is applied.

The present invention may have various modifications and various embodiments and specific embodiments will be illustrated in the drawings and described in detail.

However, this does not limit the present invention to specific embodiments, and it should be understood that the present invention covers all the modifications, equivalents and replacements included within the idea and technical scope of the present invention.

Terms such as first, second, and the like may be used to describe various components and the components should not be limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present invention will be described in detail with reference to the accompanying drawings. In describing the present invention, like reference numerals refer to like elements in the drawings for easy overall understanding and a duplicated description of like elements will be omitted.

In the drawings of this specification, a system and a method for embedding a watermark are illustrated according to an embodiment of the present invention. In a plurality of embodiments, the watermark is a form of information that is repeatedly embedded in a media sequence or a media set and the embedded information cannot be generally perceived with the human eye. However, the information constituting the watermark may be restored and is designed so that the information can be generally understood by the human at the time of restoration. In a plurality of embodiments, the watermark may be combined by emphasizing information from the selected part of the media in the media sequence or the media set. In the embodiment in which the watermark is repeatedly embedded in the media, the watermark may be amplified for the media information therebelow by combining information from a plurality of parts of the media. It is difficult to remove the watermark by a manipulation of the media by repeatedly embedding the watermark in the media. Further, the watermark is embedded in the media sequence and thus the media sequence or the media set may retain the watermark after deterioration of quality caused by reformatting or recording.

The watermark according to the embodiment of the present invention may be embedded in video media and/or audio media.

The watermark may be digital information embedded in digital media or embedded using an analog process. The watermark according to the embodiment of the present invention may be used in order to verify a track distribution of a specific media sequence, or a recipient of the media set.

Further, the watermark may be used to embed document information in the media, to perform replication control, to perform broadcast monitoring, and/or to distribute secure communication.

Watermark Embedding System Using Alpha Blending

FIG. 1 is a block diagram schematically illustrating a system to which a watermark embedding method according to an embodiment of the present invention is applied. As illustrated in FIG. 1, the watermark embedding system according to the embodiment of the present invention may include a media providing server 110, a network 120, a watermark embedding apparatus 130 and an end apparatus 140.

Referring to FIG. 1, the media providing server 110 stores media which may be provided to the apparatus connected to the network 120. In many embodiments, delivery of media between the media providing server 110 and the apparatuses may be secured using encryption. The media are compressed in order to reduce an amount of data to be generally transmitted. The encrypted media received from the server is typically decrypted and decompressed for rendering, and a part of the decrypting and decompressing processes may include embedding a watermark in the decrypted and decompressed media.

In the case of the media received by a consumer electronic device such as the watermark embedding apparatus 130, the decryption and embedding processes are sometimes performed by hardware. In the case where an apparatus receiving the encrypted media software (for example, the end apparatus 140 such as a computer) may be configured, decrypting, decompressing, and/or embedding in the media of the watermark may be performed in hardware, or may be performed by using client software. After the watermark is embedded in the decrypted and decompressed media, when the media are replicated or transmitted, the watermark may be present in the media. In many embodiments, the watermark may be unique for an apparatus that receives and decrypts the media. In many embodiments, the watermark may include information on date and time when the content is received and/or information on identification for the receiving apparatus or the user. The embedded information such as the date, the time, and the identification may be initially generated from the media providing server 110 to be transmitted together with the media. Alternatively, the watermark embedding apparatus 130 may also use locally stored information including a serial number, a date, a time, and the like from an internal clock thereof. In the embodiment where the encrypted media are compressed, the watermark may be embedded in the media before or after decompression. A technology for embedding the watermark will be additionally described below.

The network 120 is an IP or cable TV network and the end apparatus 140 such as a computer or a television may be connected to the network via the watermark embedding apparatus 130. At this time, the watermark embedding apparatus 130 and the network 120 may be connected through a router such as a modem.

The watermark embedding apparatus 130 receives the media from the server 110 to embed a watermark pattern and performs alpha blending to provide an alpha blended stego image to the end apparatus 140. The watermark embedding apparatus 130 may be implemented as a set-top box, a cable box, or the like, but is not necessarily limited thereto. Various consumer electronic devices and computer processing devices that embed the watermark in an image and perform alpha blending may perform the functions of the watermark embedding apparatus 130.

Further, the end apparatus 140 connected to the watermark embedding apparatus 130 is not necessarily limited to a computer and a TV. Any of various connected and disconnected consumer electronic devices and computer processing devices (e.g., a PC, a laptop, a smartphone, a PDA, etc.) may output alpha blended image according to the embodiment of the present invention.

According to another embodiment of the present invention, the watermark embedding apparatus 130 may perform alpha blending while embedding the watermark pattern and directly output an alpha blended stego image at the same time.

In the embodiment illustrated in FIG. 1, distribution of the medial through the network and embedding of the watermark after the distribution are involved.

In many embodiments of the present invention, the watermark embedding apparatus 130 may directly select a watermark pattern, embed the selected watermark pattern, and perform alpha blending. In this case, the selected watermark pattern may include identification information of the watermark embedding apparatus 130 and/or identification information of the recipient which is a user of the apparatus. Alternatively, as described above, reception date and/or time information (time stamp information) may be embedded.

Figure 2:
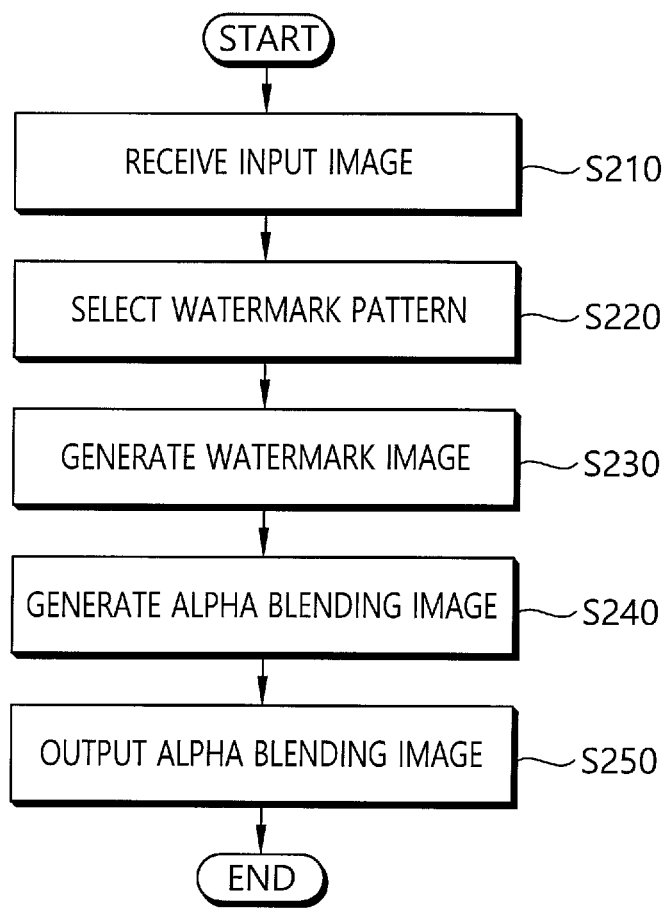
FIG. 2 is a flowchart schematically illustrating a watermark embedding method according to an embodiment of the present invention.

FIG. 2 is a flowchart schematically illustrating a watermark embedding method according to an embodiment of the present invention.

Referring to FIG. 2, the watermark embedding apparatus receives a media input image which is received through the network or retained itself.

In addition, a watermark pattern to be embedded in the input image is selected (S220). The information related with the watermark pattern may include and reception date and/or time information as well as apparatus identification information for identifying the watermark embedding apparatus or recipient identification information.

After the watermark pattern to be embedded in the media is selected, the watermark embedding apparatus generates a watermark image based on the selected watermark pattern (S230).

In the embodiment of the present invention, as described above, the watermark pattern has a pattern value. In this case, the largest possible difference value between the pixel value of the original image and the pixel value of the stego image of the portion to be embedded according to the embedding of the pattern value of the watermark pattern is calculated. Allowable ranges of watermark pixel values and alpha values are calculated by using an alpha blending map that defines at least one of the allowable ranges of the watermark pixel values and the alpha values within the calculated difference value. In addition, a watermark image may be generated by randomly determining the watermark pixel value and the alpha value based on the watermark pattern value within the calculated ranges.

Further, according to another embodiment of the present invention, as described above, it is possible to consider not only the method of calculating based on the difference of the pixel value through one-to-one comparison of the pixels in one original image and the pixels in the stego image, but also the method of adjusting an image quality difference between the stego images before and after the embedding of the watermark not to be large. That is, the pixel difference value of successive stego images may be controlled based on the average value thereof without considering the pixel values themselves of the watermark pattern. That is, when a difference d1 in pixel value between correlation pixel values having a temporal-spatial correlation with respect to all pixels in the original input image and a difference d2 in pixel value between correlation pixel values having the same correlation in the stego image are present, watermarking through alpha blending may be performed so that a variation of the two difference values d1−d2 becomes a predetermined value d. In this case, when a value which belongs to a higher value than an average value is embedded in the pattern, an actual watermark pixel value may be close to +d/2, that is, an upper limit of a tolerance. On the contrary, when a value which belongs to a lower value than the average value is embedded in the pattern, an actual watermark pixel value may have a value close to −d/2, that is, a lower limit of a tolerance.

Further, in this case, appropriate watermark pixel values and alpha values may be determined by calculating at least one of the watermark pixel value range and the alpha value range without directly considering the pixel value of the original input image.

When a watermark image having the watermark pixel value determined in the above method is generated, the generated watermark image and the input image are alpha-blended to generate an alpha blended stego image (S240).

Next, the alpha-blended stego image may be directly output or provided to another apparatus in the above-described method (S250).

Figure 3:
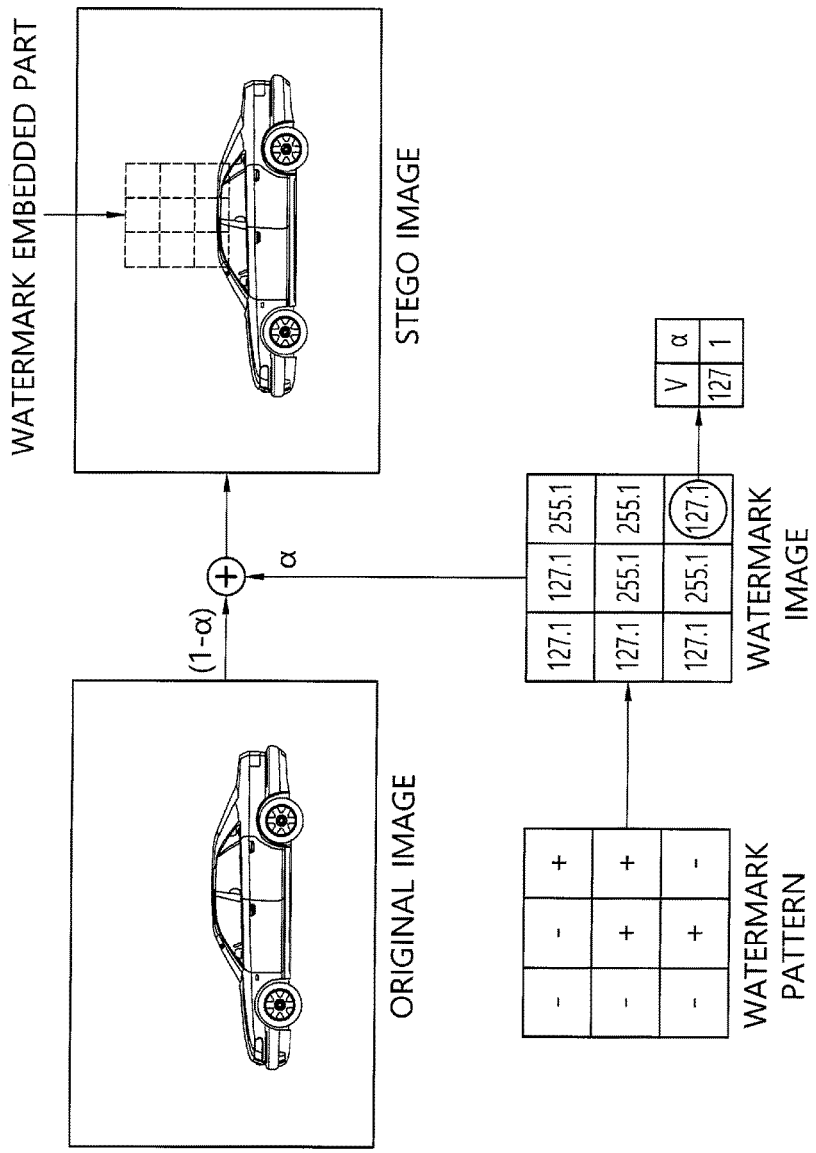
FIG. 3 is a conceptual view for describing a process of generating a stego image by performing alpha blending by generating a watermark image based on a watermark pattern in accordance with a watermark embedding method according to an embodiment of the present invention.

FIG. 3 is a conceptual view for describing a process of generating a stego image by performing alpha blending by generating a watermark image based on a watermark pattern in accordance with a watermark embedding method according to an embodiment of the present invention.

Referring to FIG. 3, a watermark image is generated based on a watermark pattern selected to be embedded in the original input image by receiving a source input image and multiplying the corresponding image by a specific coefficient (for example, (1-α)), and the corresponding image is multiplied by a coefficient (for example, α) to synthesize a multiplied image, and then an overlay image in which the watermark is overlaid, that is, an alpha blended stego image may be generated. In this case, display strength of the watermark in the overlaid image may be determined according to a α value.

This is expressed by Equation below.

$$s=(1-\alpha)\times O+w\times \alpha$$

Herein, s may mean a specific pixel of the alpha blended stego image, that is, the overlaid image and α may mean strength of alpha blending as the alpha blending coefficient. Further, w means a watermark value and O may represent a pixel value of the original media image.

Whether the watermark is visible or fuzzy may be determined by varying the a value, and preferably, the watermark may be displayed to be blurred like noise of the input image enough not to recognize the alpha blended image by a user viewing the alpha blended image.

In this case, the selected watermark pattern may be expressed by one or more numbers and implemented by a watermark pattern map having a predetermined form. Each value of the pattern may be divided into either a set of values higher than the average value or a set of values lower than the average value based on the average value of the inputted watermark pattern values. That is, a portion indicated by + may mean a value higher than the average value, and a portion indicated by − may mean a value lower than the average value.

Further, as the embedded result based on each value of the watermark pattern, a watermark pixel value and an alpha value, which cause a change in pixel value of one pixel in the stego image or a change in the pixel value difference between temporal-spatially adjacent pixels may be determined through the alpha blending map. In addition, a watermark image may be generated based on the determined watermark pixel value. The watermark pixel value may be expressed by V and α. Herein, V means a value, that is, an RGB pixel value. This may mean a value for one color and/or a value for a plurality of colors in some cases. The a value is a value representing the alpha blending strength and may be differently set for each pixel. Alternatively, the a value may be differently set for each frame. As such, the watermark pattern may be randomly determined to be a value equal to or greater than the average value of the corresponding range in the case of the +pattern value according to the range of the pixel values and the range of the alpha values determined according to the alpha blending map and randomly determined to be a value equal to or less than the average value of the corresponding range in the case of the − pattern value.

Figure 4:
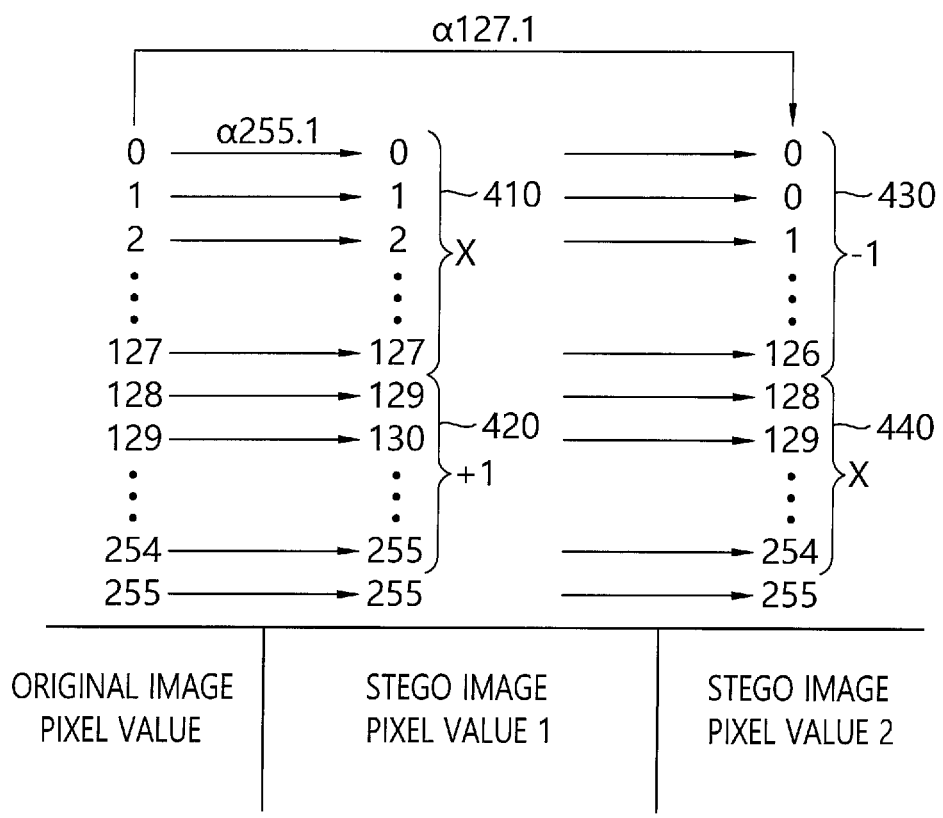
FIG. 4 is a conceptual view for describing a difference between an original image pixel value and a stego image pixel value when different watermark patterns are embedded in the original image pixel value in the watermark embedding method according to the embodiment of the present invention.

FIG. 4 is a conceptual view for describing a difference between an original image pixel value and a stego image pixel value when different watermark patterns are embedded in the original image pixel value in the watermark embedding method according to the embodiment of the present invention.

Referring to FIG. 4, when the original image has a scale of 8 bits, the original image may have pixel values of 0 to 255. In this case, when the +watermark pattern value is embedded, the pixel value of the stego image has no change from the original image pixel value in a section 410 of 0 to 127 pixel values, but has a value increased by 1 in a section 420 of 128 to 254 pixel values.

Further, when the − watermark pattern value is embedded, the pixel value of the stego image in a section 430 of 1 to 127 has a difference value of −1, and has the same pixel value as the original image pixel value in a section 440 of 128 to 255 pixel values.

This is a rule generated based on statistical values by considering all of the number of cases where the watermark pattern has values of 0 to 255 with respect to the original image pixel value of 0 to 255.

Therefore, a basic difference value d through direct comparison of the pixels of the original image and the stego image one by one has a difference of at most 1 regardless of any pixel value.

However, the basic difference value may have a difference value of at most 2 by considering a temporal or spatial change of the pixel value of the original image. For example, when the original image is changed from a pixel value of 129 to a pixel value of 2, the +watermark pattern is embedded in the image corresponding to the pixel value of 129 and then the − watermark pattern is embedded in the image corresponding to the pixel value of 2, the pixel value of the stego image corresponding to the pixel value of 129 of the original image becomes a pixel value of 130 included in the section 420 and the pixel value of the stego image corresponding to the pixel value of 2 of the original image has a value of 1 included in the section 430. Accordingly, the difference value d1 between the pixel values of the original image is 129−2=127, whereas the difference value d2 between the pixel values of the stego image is 130−1=129, and then a variation d1−d2 of the two difference values is 2, and as a result, a relative difference d1−d2 becomes 2.

In this way, when a plurality of difference value conditions applied to each pixel according to the alpha blending from the original image to the stego image are differently present and a plurality of pixel value differences according to the difference value conditions and a plurality of variations according to the pixel value difference are present, It is preferred to set the largest value among the differences and/or the variation values as a reference value for calculating the watermark pixel value range and the alpha value range. That is, when a difference value between 1 and 2 is present, 2 may be selected. After selecting a maximum difference value to be considered in the stego image, allowable watermark pixel value range and alpha value range may be calculated based on the selected difference value by referring to the alpha blending map.

Figure 5:
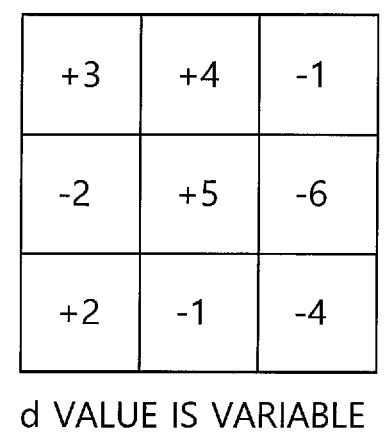

FIG. 5 is a conceptual view illustrating a configuration of a pattern in which a weight is added to a watermark pattern according to another embodiment of the present invention.

Referring to FIG. 5, the watermark pattern does not necessarily have a rectangular table shape, but may have various shapes such as a radial shape and a triangular shape. In addition, the watermark pattern needs not to be implemented with two pattern values higher and lower than the average value, but may have a value such as +3, +5, −4, −6, and the like by weighting the corresponding value. At this time, the sum of the watermark patterns is preferably converged to zero. A basic difference d and a relative difference d1–d2 between the pixel values of the stego image with respect to the pixel values of the original image may be changed according to the weight, and particularly, as the weight value increases, the difference values may increase.

Figure 6:
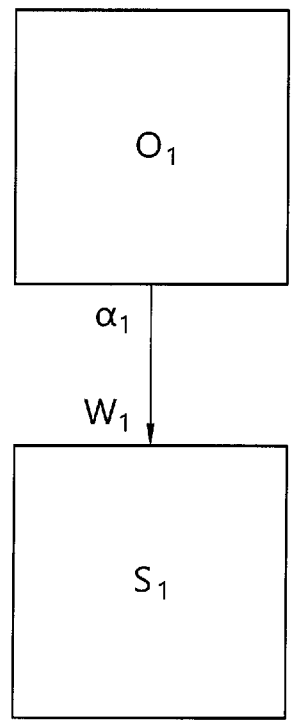
FIG. 6 is a conceptual view for describing a relationship between the original pixel value and a pixel value after the alpha blending is performed in the watermark embedding method according to the embodiment of the present invention.

FIG. 6 is a conceptual view for describing a relationship between the original pixel value and a pixel value after the alpha blending is performed in the watermark embedding method according to the embodiment of the present invention.

Referring to FIG. 6, it is assumed a situation in which a watermark pixel value $w_1$ and an alpha value $\alpha_1$ are calculated with respect to a pixel value $O_1$ of a specific pixel of the original image and a pixel value $S_1$ of a pixel at a position corresponding to the specific pixel after performing the alpha blending. Herein, since the alpha value $\alpha$ is a non-normalized value, in the case of 8 bits, the alpha value $\alpha$ may be considered as a/Max (which may represent Max=255).

Figure 7:
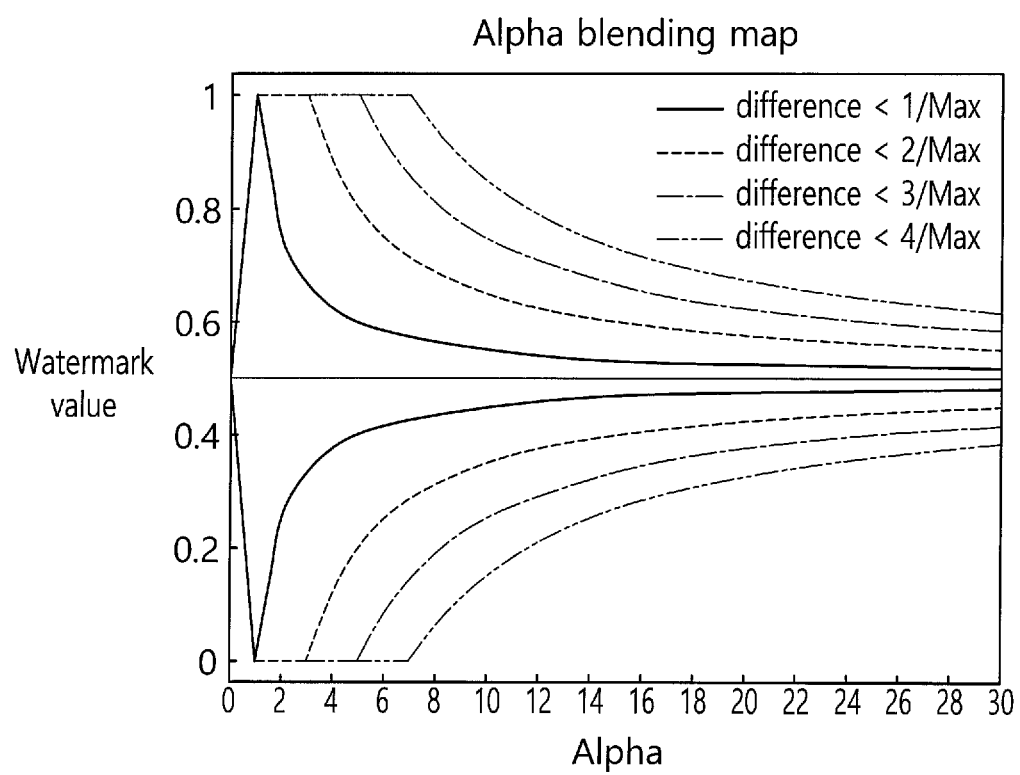
FIG. 7 is a diagram illustrating an alpha blending map illustrating ranges of watermark pixel value and an alpha value selectable depending on a difference between the original pixel value and the pixel value of the stego image after the alpha blending is performed.

FIG. 7 is a diagram illustrating an alpha blending map illustrating ranges of watermark pixel value and an alpha value selectable depending on a difference between the original pixel value and the pixel value of the stego image after the alpha blending is performed.

Referring to the alpha blending map of FIG. 7, when the original pixel value is 0.5 (assuming that the maximum value is 1 as a normalized value and may be a value of 127 in case of 8 bits), ranges of the alpha value $\alpha$ and the pixel value $w_1$ of the watermark pattern may be verified by a line in the graph according to the difference value d between the original pixel value $O_1$ and the pixel value $S_1$ of the stego image as a resulting value of the alpha blending. Such an alpha blending map may be a map that is defined by pre-calculating at least one of allowable ranges of watermark pixel values and alpha values which are changed with a correlation according to the difference value d between the pixel values. The map may be expressed by a graph as illustrated in FIG. 7 and may also be expressed by a table, an equation, and the like. Such an alpha blending map may be stored in a storage (not illustrated) in various forms by considering various parameters (e.g., a difference value between pixels, an alpha value, an original pixel value, a watermark pixel value, etc.) and the apparatus may calculate the range of the watermark pixel values and the range of the alpha values by bringing the appropriate alpha blending map according to the difference value calculation.

The watermark embedding apparatus may determine a maximum difference value by considering of the stego image of by considering the pixel value of the stego image considering the watermark pattern value embedded in the original image pixel value of FIG. 4 above and may determine the watermark pixel value and the alpha value based on the allowable ranges of the watermark pixel values and/or the alpha values on the alpha blending map corresponding to the determined difference value. When the difference value d is 1 in the alpha blending map of FIG. 7, the range of the watermark pixel values increases until the alpha value becomes 1, the pixel values in a gradually wide range may be selected, but when the alpha value exceeds 1, the selectable range of the watermark pixel values is sharply reduced. Thus, the ranges of the watermark pixel values and the alpha values corresponding to the original pixel values may be determined by using the alpha blending map. In addition, since the graph form of FIG. 7 has a shape in which all the graphs move upward in the y-axis direction as the original image pixel value increases, different ranges of the watermark pixel values and the alpha values are calculated according to the original image pixel values.

When the graph is described in more detail, the straight line in the graph of FIG. 7A shows the range of the value different from the original pixel value by the value less than 1/Max within the maximum value of the pixel value, and the ranges in which the pixel value changed by the alpha blending shows the value different from the original pixel value by the value less than 2/Max, the value different from the original pixel value by the value less than 3/Max, and the value different from the original pixel value by the value less than 4/Max.

According to the embodiment of the present invention, the pixel value range and the alpha value of the watermark pattern may be calculated through the alpha blending map including the plurality of graph lines depending on the difference value in pixel value between the original image and the alpha-blended image.

When the graph of FIG. 7 is used, when the difference between the pixel value $S_1$ of the pixel corresponding to the stego image $O_1$ and the pixel value of the original image is 1 while the pixel value $O_1$ of the specific pixel of the original input image is 0.5, only the watermark pixel value and the alpha value corresponding to an area in the solid-line graph may be considered by referring to the solid-line graph and the watermark pattern may be converted into the watermark pixel value and the alpha value of the area in the solid-line graph.

Moreover, in the graph of FIG. 7, only a case in which the difference value d is set as an integer is shown by the graph line. That is, the graph line is created through definition of an interval of 1 to configure the alpha blending map. In this case, a specific value interval for configuring the alpha blending map is not particularly set to 1. The specific value interval may be arbitrarily varied. In the embodiment of the present invention, when a specific value between the intervals of 1, for example, the difference value d is 1.5, the range of the watermark embedded pixel value corresponding to a specific alpha value may be acquired by considering a virtual graph line linking intermediate points of a solid-line graph showing a case where the difference value d is 1 and a dotted-line graph showing a case where the difference value d is 2. In this case, when the difference value d is closer to 1 than to 2, for example, when the difference value is 1.3, the virtual graph line closer to a solid-line graph line than to a dotted-line graph line may be considered by such a distance.

Figure 8:
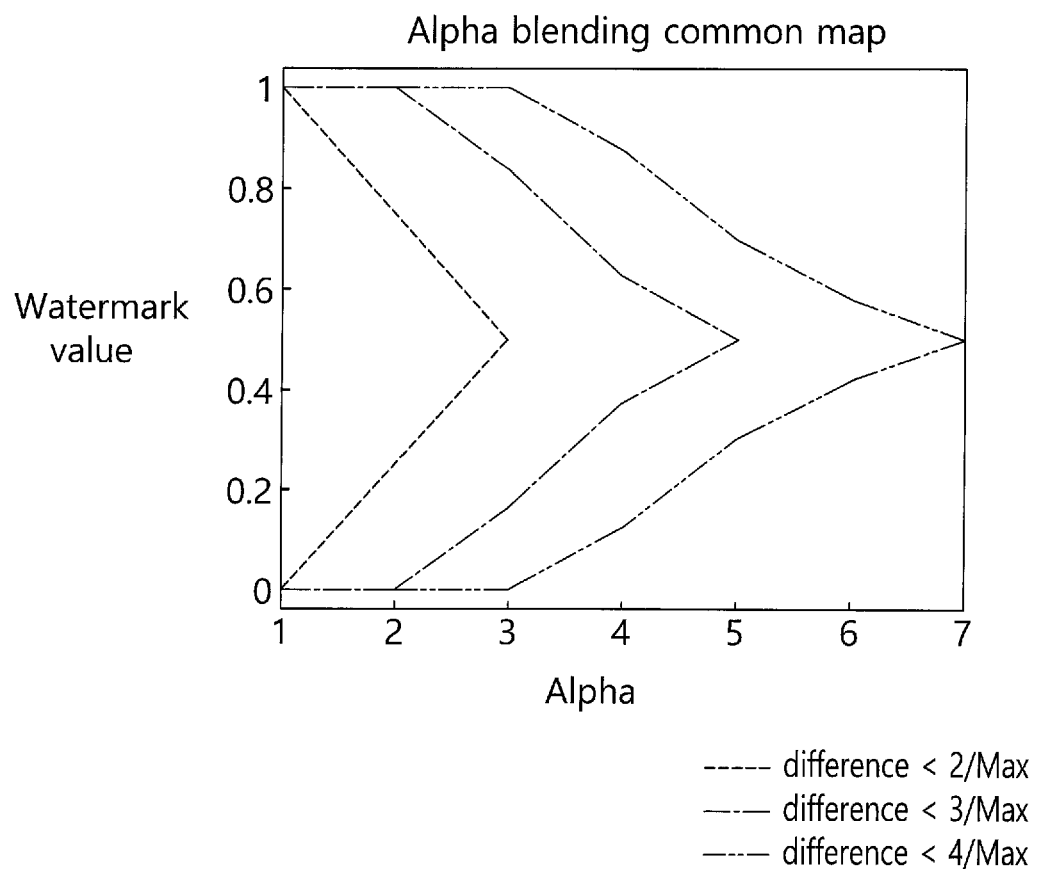
FIG. 8 is a diagram illustrating an alpha blending common map illustrating a range in which all original pixel values and the pixel value after the alpha blending is performed commonly overlap with each other.

FIG. 8 is a diagram illustrating an alpha blending common map illustrating a range in which difference values between all original pixel values and the pixel value of the stego image after the alpha blending is performed commonly overlap with each other.

Referring to FIG. 8, the range of the difference value between the original pixel value of the input image and the pixel value after the alpha blending is calculated may be verified through the alpha blending common map. A graph of FIG. 8 shows a part in which the difference values between all original pixel values and the pixel value after the alpha blending is performed are common.

As illustrated in FIG. 8, a value which is different from the original pixel value by a value less than 1/Max does not exist. In addition, as shown in an upper right end of the graph, a common range of a value which is different from the original pixel value by the value less than 2/Max, a common range of a value which is different from the original pixel value by the value less than 3/Max, and a common range of a value which is different from the original pixel value by the value less than 4/Max within a maximum value of the pixel value of the alpha-blended pixel are shown.

According to the embodiment of the present invention, the watermark embedding apparatus may calculate the range of the watermark embedding pixel value depending on the change of the alpha value based on the difference d in pixel value by using the common ranges on the alpha blending common map.

Figure 9:
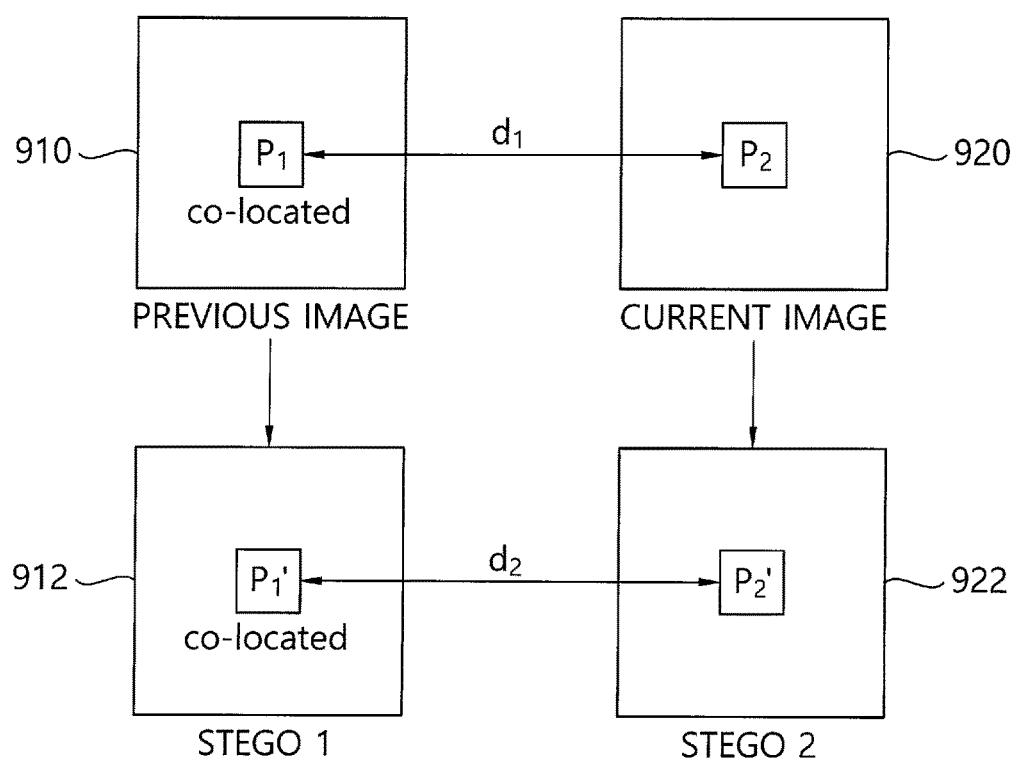
FIG. 9 is a conceptual view for describing a method for calculating a range of the watermark pixel value and a range of the alpha value based on a difference in pixel value between pixels having a temporal correlation in the watermark embedding method according to the embodiment of the present invention.

FIG. 9 is a conceptual view for describing a method for calculating a range of the watermark pixel value and a range of the alpha value based on a difference in pixel value between pixels having a temporal correlation in the watermark embedding method according to the embodiment of the present invention.

Referring to FIG. 9, the watermark embedding method of the present invention may be applied to the pixels having the temporal correlation. When a difference in pixel value between a pixel P2 of a current original image 920 and a co-located pixel P1 of a previous image 910 is defined as d1 and a difference in pixel value between a pixel P2' of a stego image, which corresponds to the pixel P2 of the current image 920 and a pixel P1' of a stego image 912, which corresponds to the pixel P1 of the previous image 910 is defined as d2, as the original image pixel is changed from the pixel P1 to the pixel P2, the stego image pixel is also changed from the pixel P1' to the pixel P2' which correspond thereto and a difference between the change d1 of the pixels of two images in the original image and the change d2 of the pixels in two images in the stego image has a predetermined relative difference d1−d2 according to the difference value in pixel between the original image and the stego image in which the watermark is embedded in FIG. 4. Therefore, as the pixel value of the pixel P2 of the current image is changed, the relative difference d1−d2 may also be determined as a maximum available difference value and the alpha blending map appropriate to the determined maximum available relative difference d1−d2 is adopted to determine at least one of the range of the pixel value in the watermark pattern embedded in the pixel P1 and/or the pixel P2 and the range of the alpha value.

In the embodiment of the present invention, the image having the temporal correlation is not particularly limited to the previous frame and may include a frame having a reference relationship at a predetermined interval and may include even a subsequent output frame as well as the previous frame.

Figure 10:
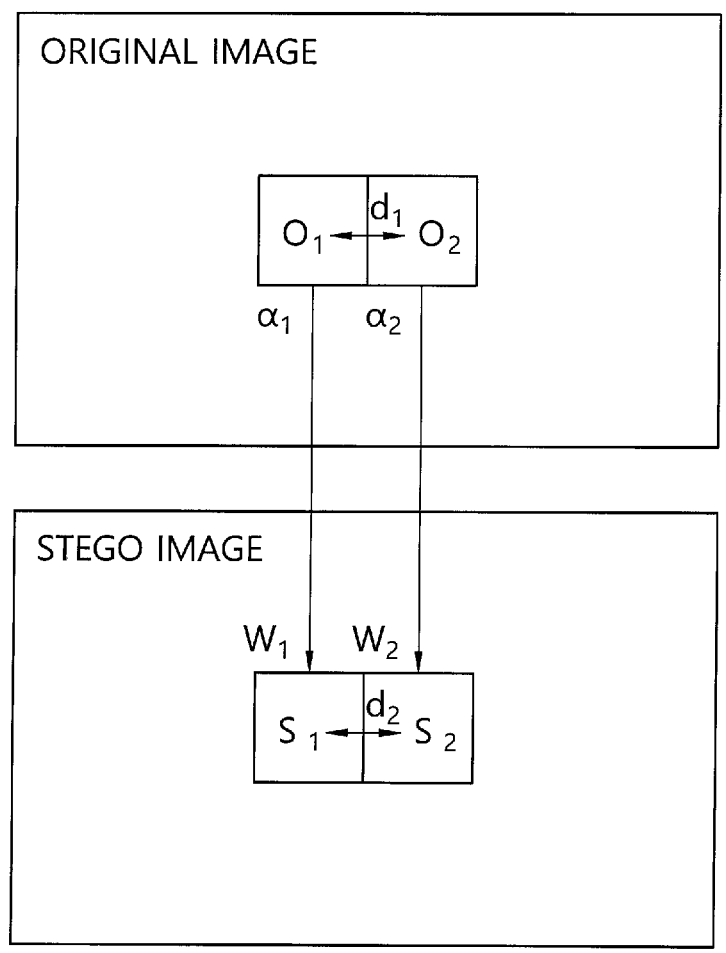
FIG. 10 is a conceptual view for describing a method for calculating the range of the watermark pixel value and the range of the alpha value based on the difference in pixel value between pixels having a spatial correlation in the watermark embedding method according to the embodiment of the present invention.

FIG. 10 is a conceptual view for describing a method for calculating the range of the watermark pixel value and the range of the alpha value based on the difference in pixel value between pixels having a spatial correlation in the watermark embedding method according to the embodiment of the present invention.

Referring to FIG. 10, when pixels values $O_n$ of two pixels O1 and O2 having the spatial correlation of the original image exist and pixels $S_n$ of two pixels S1 and S2 having the spatial correlation in the stego image after the alpha blending is calculated exist, the pixel values $S_n$ of the stego image are shown by using an alpha value $\alpha_n$ and a watermark value $w_n$ based on the pixel values $O_n$.

Even in the embodiment of FIG. 10, similarly to FIG. 9, when the difference of the pixel values of two adjacent pixels O1 and O2 in the original image is defined as d1 and the difference of the pixel values of two adjacent pixels S1 and S2 of the stego image corresponding to the current image is defined as d2, the difference d1 of the pixel values of the adjacent pixels in the original image and the difference d2 of the pixel values of the adjacent pixels in the stego image may also have the predetermined relative difference d1−d2 according to the difference value in pixel between the original image and the stego image in which the watermark is embedded.

That is, as the pixel value of the pixel O2 of the current image is changed, the relative difference d1−d2 may also be determined as the maximum available difference value based on the table of FIG. 4. In addition, the alpha blending map appropriate to the determined maximum available relative difference d1−d2 is adopted to determine at least one of the range of the pixel value in the watermark pattern in which the pixel O1 and/or the pixel P2 is embedded and the range of the alpha value.

In the embodiment of the present invention, the pixels having the spatial correlation need not be particularly adjacent to each other and may include pixels having the reference relationship with the corresponding pixel, which are not adjacent to each other.

In the embodiment of the present invention, when two adjacent pixel values of the original image are 105 and 100, values patterns to be embedded in corresponding positions are + and −, and the difference value d is 2, the difference d1 in pixel value between the adjacent pixels in the original image becomes 105−100=5. In addition, by a watermark pattern value to be input, +1 and −1 are embedded in the respective pixels through alpha blending, and as a result, the pixel values of the stego image are modulated to 106 and 99. In this case, the difference d2 becomes 106−99=7 and since the difference between d1 and d2 is |d1−d2|=2, the difference is within the range of the d value. Therefore, the range or a list of the watermark embedded pixel values in which +1 and −1 may be embedded while the alpha blending may be derived from the embedding patterns of + and − so as to determine the watermark pixel value which satisfies the d value. In addition, the watermark image may be generated by selecting the values in the derived range or list.

Figure 11:
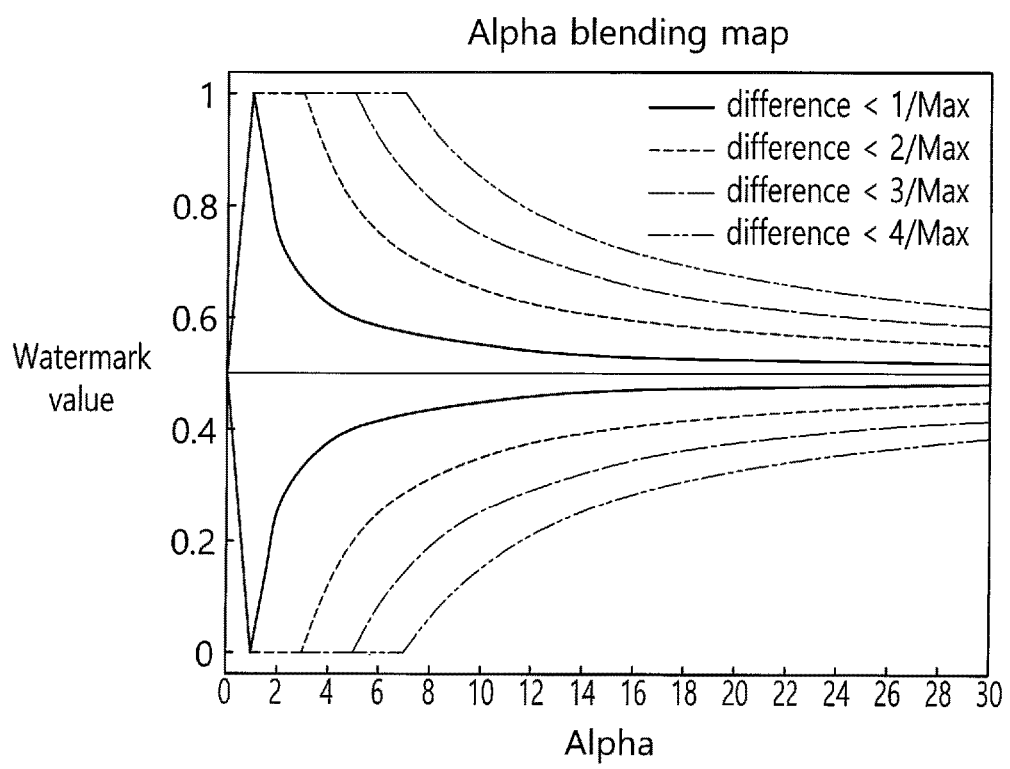
FIG. 11 is a diagram illustrating an alpha blending map illustrating ranges of watermark pixel value and an alpha value selectable depending on a difference between the original pixel value and the pixel value of the stego image after the alpha blending is performed.

FIG. 11 is a diagram illustrating an alpha blending map illustrating ranges of watermark pixel value and an alpha value selectable depending on a difference between the original pixel value and the pixel value of the stego image after the alpha blending is performed.

Referring to FIG. 11, the range of the watermark pixel value depending on the change of the alpha value may be verified to correspond to the difference $d_1$ in pixel value between two adjacent pixels O1 and O2 in the original image and the difference $d_2$ in pixel value between two adjacent pixels O1 and O2 after the alpha blending is calculated. The watermark embedding apparatus may precalculate the relative difference d between the difference values d1 and d2 of the adjacent pixel values by using acceptable difference values in the table of FIG. 4 based on based on the watermark pattern values and determine the relative difference d as a largest difference value between the calculated difference values. In addition, the pixel value for at least one of the pixel O1 and the pixel O2 of the original image is shown by a graph line by calculating the relationship of respective parameters such as the range of the acceptable watermark pixel value and the range of the alpha value according to the determined difference value d. In the embodiment, a plurality of graph lines or more may be shown according to the difference value d and the alpha blending map including the graph lines may be calculated and prestored.

In the graph of FIG. 11, the ranges of the difference d ($d_2-d_1$) between the difference value d1 between the adjacent pixels of the stego image after the alpha blending is calculated as the parameters are changed and the difference value d1 of the original pixel values are shown by different lines as shown in the upper right end of the graph. An abstract shape of the graph is a shape in which the range moves up in a y-axis direction as the pixel value of any one pixel $O_2$ of the original image and a range level is increased and changed as a value of $w_1$ increases. Further, as a value of $\alpha_1$ increases, the range level is changed according to a condition of the $w_1$ value.

In the embodiment, a straight line indicates a range of a value showing a difference less than 1/Max within the maximum value of the pixel value. In addition, as shown on the upper right end of the alpha blending map, each dotted line shows the range of the value showing the difference less than 2/Max within the maximum value of the pixel value, the range of the value showing the difference less than 3/Max, and the range of the value showing the difference less than 4/Max according to the shape of each dotted line.

According to the embodiment of the present invention, similarly to the methods described in FIGS. 6 to 8, the pixel value range and the alpha value range of the watermark pattern may be calculated through the alpha blending map by using the graph of FIG. 11 and the pixel value and the alpha value corresponding to the watermark pattern value may be appropriately determined within the calculated ranges.

Figure 12:
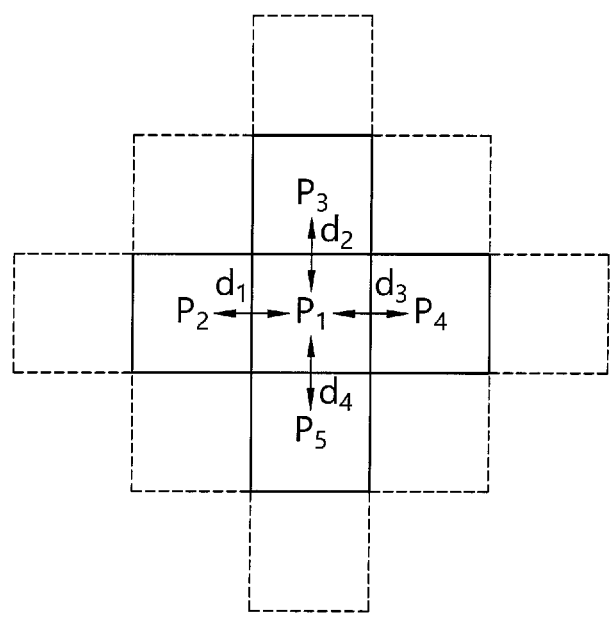
FIG. 12 is a conceptual view for describing a method for calculating the watermark pixel value and the alpha value by using a variation of a difference of a plurality of pixel values of a plurality of pixels having temporal-spatial correlations.

FIG. 12 is a conceptual view for describing a method for calculating the watermark pixel value and the alpha value by using a variation of a difference of a plurality of pixel values of a plurality of pixels having a temporal-spatial correlation.

Referring to FIG. 12, a plurality of pixels having a temporal-spatial correlation may be present in one pixel P1 of an original image. In the embodiment, four spatially associated pixels P2, P3, P4, and P5 are just considered, but a considered range may be widened by a difference value from pixels existing at other positions (see pixels represented by a dotted line). Further, the spatially associated pixels and the temporally associated pixels may be considered.

Differences between pixel values with respect to four associated pixels have four difference values such as d1, d2, d3, and d4 and when the difference values are converted into a stego image, the differences between the corresponding pixel values may be defined as d1', d2', d3', and d4'. The pixel values and the alpha values of the watermark embedded in the corresponding pixel P1 may be calculated through the watermark pixel value range and the alpha value range which simultaneously satisfy a plurality of variations d1'–d1, d2'–d2, d3'–d3, d4'–d4 by referring to the alpha blending map based on the variations d1'–d1, d2'–d2, d3'–d3, d4'–d4 between differences d1', d2', d3', and d4' of pixel values between adjacent pixels in the stego image and the differences d1, d2, d3, d4 of the pixel values between adjacent pixels in the original image according to the embedding of the watermark pattern and alpha blending. This will be described by a graph line on an alpha blending map as illustrated in FIG. 13.

FIG. 1,3 is a graph illustrating the ranges of the watermark pixel value and the alpha value based on the variations of the differences between the plurality of pixel values of FIG. 12.

Figure 13:
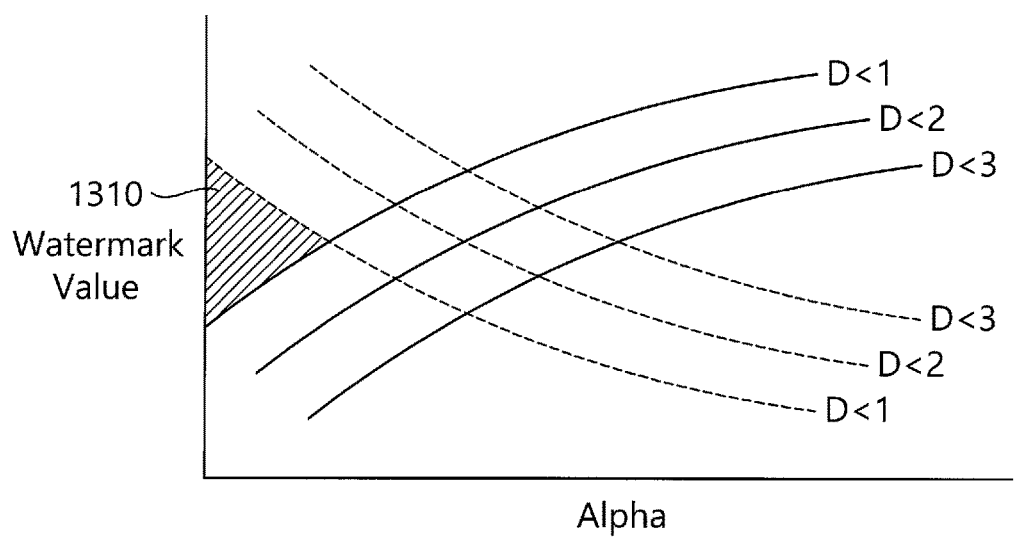
FIG. 13 is a graph showing the ranges of the watermark pixel value and the alpha value based on the variation of the difference of the plurality of pixel values of FIG. 12.

Referring to FIG. 13, in a relationship between the pixel P1 and an adjacent pixel P2 and between the pixel P1 and an adjacent pixel P3, it is assumed that an allowable range of the pixel values of the watermark pattern embedded in the corresponding pixel P1 is determined by considering relative variations d1'–d1 and d2'–d2 of difference values between the pixels in the original image and the difference values between the pixels in the stego image. In this case, a graph line on the alpha blending map related with the variation d1'–d1 may be represented by a solid line and a graph line on the alpha blending map related with the variation d2'–d2 may be represented by a dotted line. Since the pixel value of the watermark pattern embedded in the corresponding pixel P1 needs to satisfy the relationship between two variations d1'–d1 and d2'–d2, the watermark pixel value and the alpha value need to be determined within an allowable intersection period 1310 of the watermark pixel value range and the alpha value range represented by two graph lines below. Accordingly, the watermark pixel value and the alpha value may be determined as the values within the period 1310. With such a logic, when considering a relationship between a plurality of pixels in a spatial-temporal correlation, a narrower range of the watermark pixel values and the alpha values is calculated as an intersection, and a plurality of considerable spatial-temporal correlations needs to be considered to more accurately calculate the watermark pixel values and the alpha values.

Figure 14:
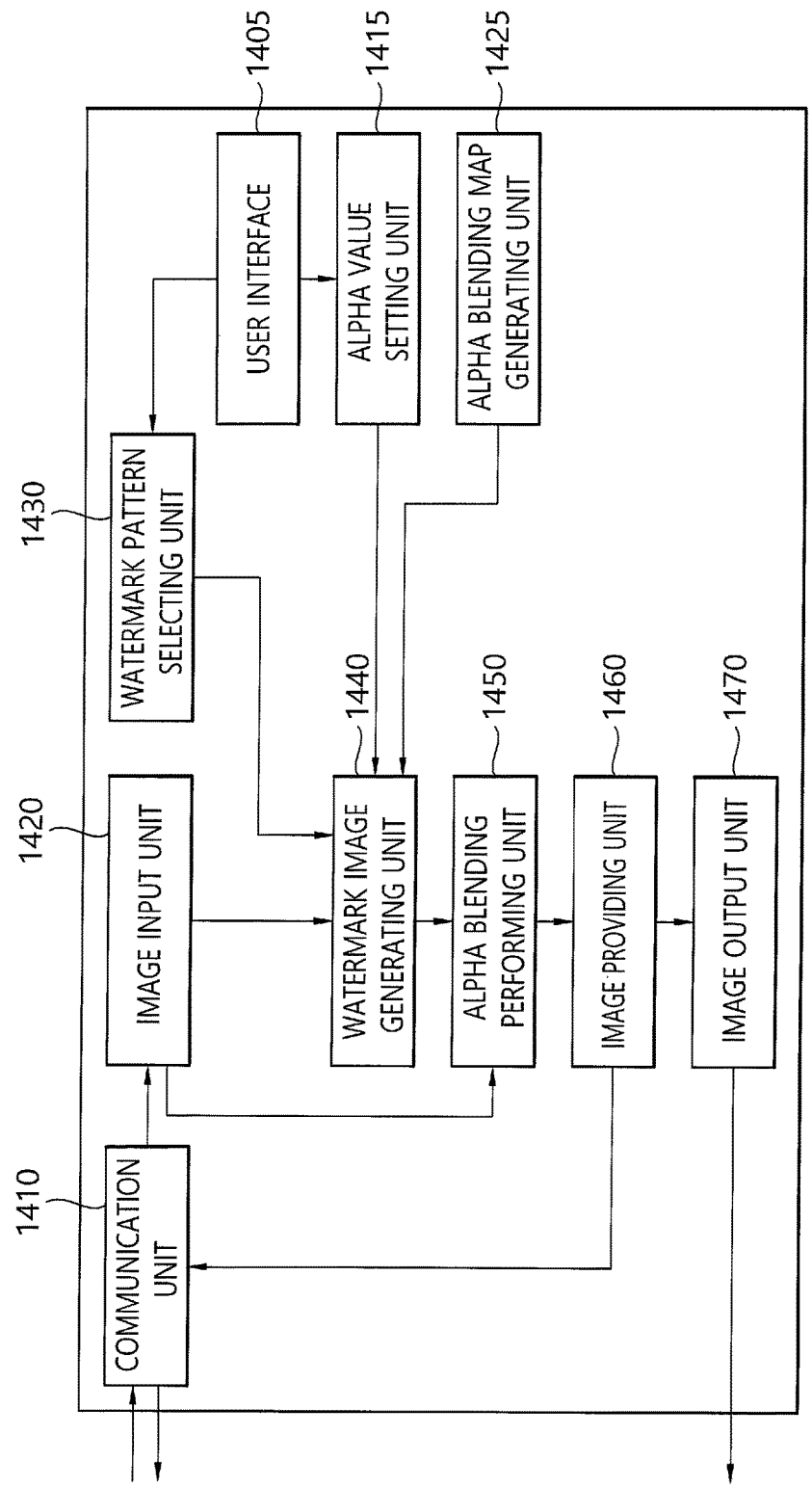
FIG. 14 is a block diagram schematically illustrating a watermark embedding apparatus according to an embodiment of the present invention.

FIG. 14 is a block diagram schematically illustrating a watermark embedding apparatus according to an embodiment of the present invention. As illustrated in FIG. 14, a watermark embedding apparatus according to an embodiment of the present invention may include a communication unit 1410, an image input unit 1420, a watermark pattern selecting unit 1430, a watermark image generating unit 1440, an alpha blending performing unit 1450, an image providing unit 1460, and a video output unit 1470. Each constituent element may be implemented by a memory including commands associated with a performing function and one or more hardware processors performing the same.

Referring to FIG. 14, the communication unit 1410 is connected to a wireless or wired network to transmit and receive media.

The image input unit 1420 receives media image information received through the communication unit 1410. In addition, the received image information is provided to the watermark image generating unit 1440.

The watermark pattern selecting unit 1430 selects a watermark pattern to be inserted. In this case, the selected watermark pattern may be predetermined by user setting. The selected watermark pattern may be arbitrarily changed through a user interface 1405. For example, the watermark pattern may be recipient information or information such as a reception date.

The alpha value setting unit 1415 sets an alpha value of the watermark pattern inserting apparatus. The alpha value may be predetermined. In this case, the alpha value is fixed to the set value in a pixel value range and a an alpha value range of the watermark pattern calculated though an alpha blending map and only the watermark pixel value needs to be simply determined according to a range in the corresponding graph line. The alpha value may be arbitrarily changed through the user interface 1405, and may be set to variably have a different value for each pixel without presetting the alpha value.

The watermark image generating unit 1440 receives the input image from the image input unit 1420 and receives the watermark pattern information selected by the watermark pattern selecting unit 1430 to calculate pixel values of the watermark pattern based on the alpha value set in the alpha value setting unit 1415. When there is no preset alpha value in the alpha value setting unit 1415, the watermark image generating unit 1440 determines an alpha value to be applied to each watermark pixel.

In this case, with respect to the pixels in which the watermark pattern is inserted among the pixels in an original input image, a difference d between the pixel value of the original image and the pixel value of the corresponding pixel of the alpha blended stego image is set to a maximum value by considering all possible cases, and a pixel value range and an alpha value range of the watermark pattern may be calculated by using the alpha blending map based on the set difference value. At this time, the alpha blending map may be brought from an alpha blending map storage unit 1425. The alpha blending map storage unit 1425 may store various types of alpha blending maps and alpha blending common maps by considering various parameters such as a difference d between the pixel values, an original pixel value, a watermark pixel value, and an alpha value.

In addition, the pixel value may be determined to a value corresponding to the corresponding pattern value of the watermark within the range calculated through the alpha blending map, and the corresponding alpha value may also be determined.

Further, according to another embodiment of the present invention, based on a variation $d_1-d_2$ between a difference $d_1$ between pixel values of two pixels associated in time and space in the input image and a difference $d_2$ between pixel values of two associated pixels of the alpha blended stego image, the range of the pixel value of the watermark pattern and the range of the alpha value may be calculated by using the watermark map. In addition, the watermark pixel value and/or the alpha value may be determined as the value corresponding to the pattern value by considering the pattern value of the watermark pattern embedded in a specific pixel of the input image within the calculated range. In addition, a watermark image may be generated based on the determined watermark pixel value and the alpha value.

The alpha blending performing unit 1450 performs alpha blending on the basis of the image signal received from the image input unit 1420 and the watermark image generated by the watermark image generating unit 1440 to generate an alpha blended stego image. Herein, the watermark pattern may be appropriately alpha-blended at the corresponding position of the input image.

The image providing unit 1460 provides the alpha blended stego image to the image output unit 1470 or to the communication unit 1410 for transmission to another apparatus (an end apparatus of FIG. 1).

The image output unit 1470 may directly output the alpha blended image.

Watermark Embedding System for Broadcast or Content Signal

Figure 15:
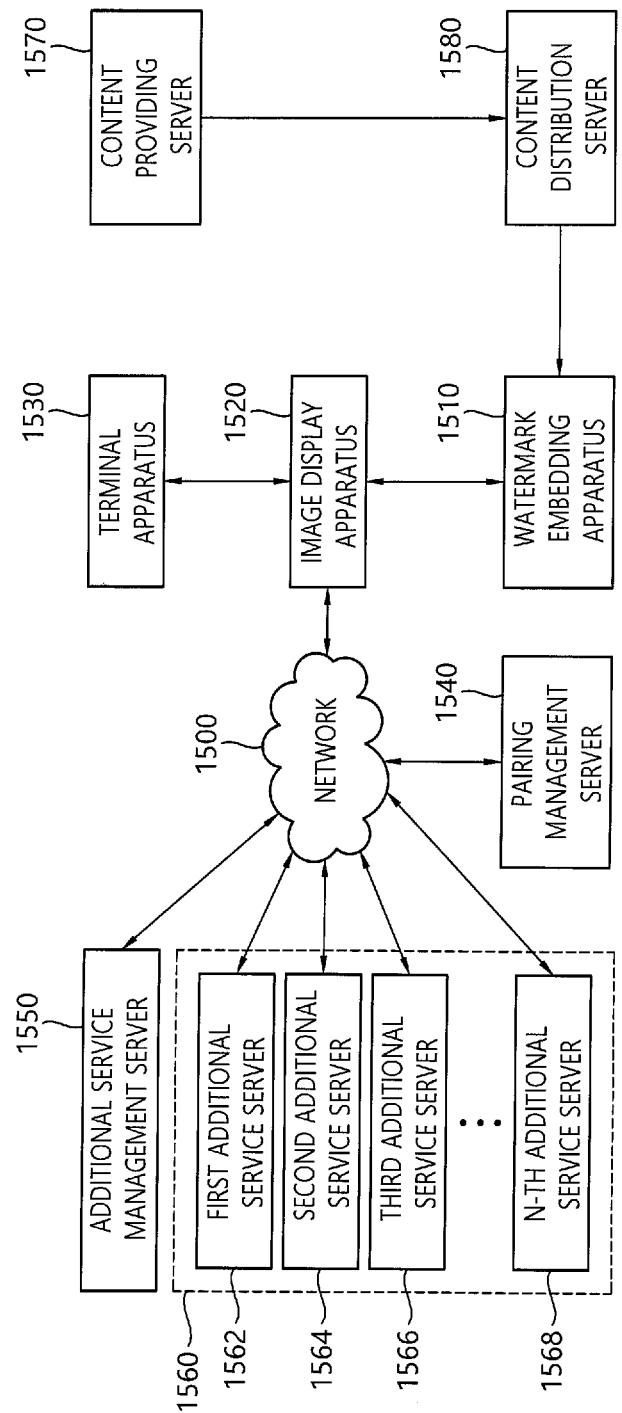
FIG. 15 is a block diagram illustrating a configuration of a watermark embedding system according to another embodiment of the present invention.

FIG. 15 is a block diagram illustrating a configuration of a watermark embedding system according to another embodiment of the present invention. As illustrated in FIG. 15, a watermark embedding system according to another embodiment of the present invention includes a broadcast receiving apparatus 1510, an image display apparatus 1520, a terminal apparatus 1530, a pairing management server 1540, an additional service management server 1550, an additional service server 1560, a content providing server 1570, and a content distribution server 1580.

The watermark embedding apparatus 1510 receives at least one broadcast signal or content signal from the additional service server 1560 or the content distribution server 1580 via a network 1500 to embed the watermark into a vide signal or an audio signal according to the received broad signal or content signal. In addition, the signal embedded with the watermark may be directly output or provided to the image display apparatus 1520. The watermark embedding apparatus 1510 may perform the alpha blending described above.

According to the embodiment of the present invention, the watermark embedding apparatus 1510 may be a set-top box receiving the broadcast signal or content signal. The watermark embedding apparatus 1510 receives various types of broadcast signals or content signals and may restore and output video signals and audio signals included in the received broadcast signals or content signals. Accordingly, the watermark embedding apparatus 1510 may transmit the restored video signals and the audio signals to the image display apparatus 1520 so that the image display apparatus 1520 outputs the video signals and the audio signals.

In addition, the watermark embedding apparatus 1510 may embed a watermark for identifying information embedded in at least one of the video signal and the audio signal included in the received broadcast signal or content signal. The more detailed content therefor will be described.

Meanwhile, the watermark embedding apparatus 1510 according to the embodiment of the present invention, for example, as an intelligent broadcast receiving apparatus to which a computer supportable function is added to a broadcast receiving function, is added with an Internet function and the like while being faithful to a broadcast reception function and controlled with a more convenient interface such as a handwriting input apparatus, a touch screen or a space remote controller. In addition, the watermark embedding apparatus 1510 may be connected to the Internet and the computer through the support of a wired or wireless Internet function to perform functions such as e-mail, web browsing, banking, or a game. For these various functions, a standardized general-purpose operating system (OS) may be used.

Accordingly, the watermark embedding apparatus 1510 described in the present invention may perform various user-friendly functions because various applications may be freely added or deleted, for example, on a general-purpose OS kernel.

The video display apparatus 1520 may output video and audio based on the video signal and the audio signal received from the watermark embedding apparatus 1510.

Specifically, for example, the video display apparatus 1520 may be a network TV, a hybrid broadcast broadband TV (HBBTV), a smart TV, an LED TV, an OLED TV and the like and may also be applied to the terminal apparatus 1530 to be described below in some cases.

The terminal apparatus 1530 may communicate with other apparatuses. In addition, the terminal apparatus 1530 may provide various functions in addition to the communication function. For example, the terminal apparatus 1530 may provide complex functions such as photographing of still pictures or moving pictures, playing of music or moving picture files, games, receiving of broadcast, and the like and be implemented in a form of a multimedia player.

According to the embodiment of the present invention, the terminal apparatus 1530 may include mobile phones, smart phones, laptop computers, digital broadcasting terminals, personal digital assistants (PDAs), portable multimedia players (PMPs), navigation systems, slate PCs, tablet PCs, ultrabooks, wearable devices (e.g., a smartwatch), smart glasses, head mounted displays (HMD), and the like.

The paring management server 1540 may process information and operations associated with pairing between the watermark embedding apparatus 1510 and the terminal apparatus 1530.

The pairing management server 1540 may retrieve information related to at least one content and broadcast channel output from the watermark embedding apparatus 1510. In addition, the pairing management server 1540 may verify unique information of the watermark embedding apparatus 1510 for identifying the watermark embedding apparatus 1510 and provide the verified unique information to other apparatuses. The detailed contents therefor will be described.

The additional service management server 1550 may manage at least one additional service server 1560 that provides various additional services. In addition, the additional service management server 1550 may provide an additional service list for at least one additional service.

The additional service server 1560 may provide various additional services or additional information. Herein, the additional service or additional information may include information regarding broadcast services and contents and may include various goods and advertisement information. For example, the additional service server 1560 may provide additional service or the additional information to at least one of the watermark embedding apparatus 1510, the video display apparatus 1520, and the terminal apparatus 1530.

The additional service server 1560 may include a plurality of additional service servers 1562 to 1568.

Meanwhile, the additional service management server 1550 and the additional service server 1560 may be implemented as one server. For example, the additional service management server 1550 and the additional service server 1560 may be implemented as an additional service information server 1850 or 2040 (see FIGS. 18A, 18B, and 20).

The content providing server 1580 may provide at least one content to the content distribution server 1590. For example, the content providing server 1580 may be a broadcast service providing server for providing a broadcast service and may be a VOD providing server for providing a video on demand (VOD). In addition, the content providing server 1580 may also be a broadcast station that transmits the broadcast signal.

The content distribution server 1590 may receive a broadcast signal for at least one of the provided contents, multiplex the received broadcast signal, and provide the multiplexed broadcast signal to the watermark embedding apparatus 1510.

For example, the content distribution server 1590 may be a distribution server corresponding to a cable broadcasting company or an internet protocol television (IPTV) provider.

The network 1500 may be a network for communicating between one or more apparatuses described above. Accordingly, one or more apparatuses described above may be connected to the network 1500 by wire or wireless communication.

Meanwhile, the aforementioned watermark embedding system may include only some of the aforementioned configurations according to the selection of the user or the designer.

Further, some of the configurations included in the watermark embedding system may be included in one configuration or may be configured in a plurality of configurations. For example, the additional service management server 1550 and the additional service server 1560 described above may be configured as one server, and the pairing management server 1540 and the additional service management server 1550 may be configured as one server. In addition, the content providing server 1580 and the content distribution server 1590 may be configured as one server.

Figure 16:
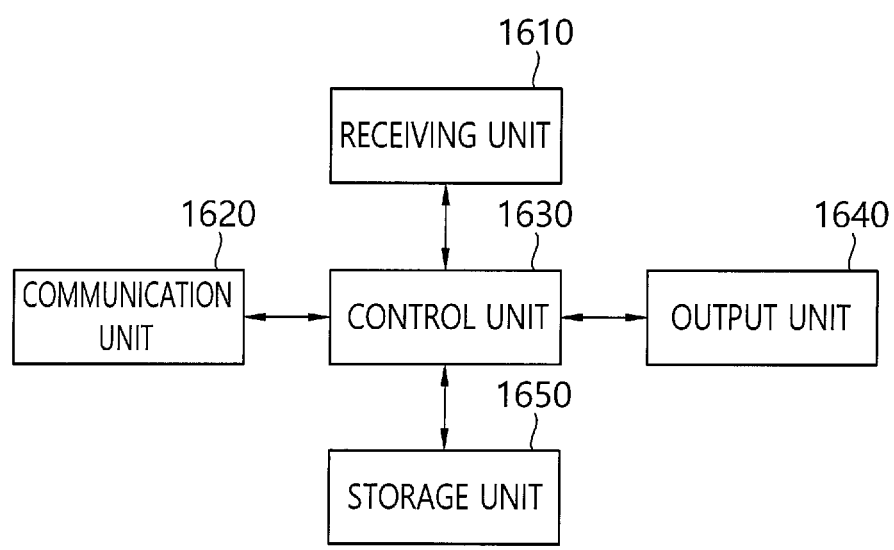
FIG. 16 is a block diagram illustrating a configuration of a watermark embedding apparatus according to another embodiment of the present invention.

FIG. 16 is a block diagram illustrating a configuration of a watermark embedding apparatus according to another embodiment of the present invention.

Referring to FIG. 15, the watermark embedding apparatus may include a receiving unit 1610, an input unit 1620, a control unit 1630, an output unit 1640, and a storage unit 1650.

The receiving unit 1610 may receive at least one broadcast signal to tune a selected channel signal and receive the tuned channel signal. In addition, the receiving unit 1610 may perform demodulation and channel decoding for the received channel signal. Accordingly, the receiving unit 1610 may extract a main broadcast signal.

The communication unit 1620 may communicate with at least one other apparatus. For example, the communication unit 1620 may communicate with at least one of the image display apparatus, the terminal apparatus, the pairing management server, the additional service management server, and the additional service server. The communication unit 1620 may communicate with at least one other apparatus through the aforementioned network 1500.

The control unit 1630 may control an overall operation of the watermark embedding apparatus. The control unit 1630 may process the video signal and the audio signal according to the broadcast signal extracted by the receiving unit 1610. In addition, the control unit 1630 may provide the video signal and the audio signal processed through the output unit 1640 to the image display apparatus.

The control unit 1630 may embed a watermark for identifying information embedded in at least one of the video signal and the audio signal according to the extracted broadcast signal.

As an example of the present invention, the control unit 1630 may embed a watermark including unique identification information of the watermark embedding apparatus.

As another example, the control unit 1630 may embed a watermark including content information for a content corresponding to at least one of the video signal and the audio signal provided from the watermark embedding apparatus to the image display apparatus.

As yet another example, the control unit 1630 may also embed a watermark including content information for channels corresponding to the video signal and the audio signal provided from the watermark embedding apparatus to the image display apparatus.

As still another example, the control unit 1630 may also embed a watermark including pairing information for pairing with the watermark embedding apparatus.

The output unit 1640 may output at least one of the video signal and the audio signal.

The output unit 1640 may include an output terminal for outputting at least one of the video signal and the audio signal to the image display apparatus and output at least one of the video signal and the audio signal to the image display apparatus through the output terminal.

For example, the output terminal of the output unit 1640 may include at least one of a high definition multimedia interface (HDMI) and an audio/video (AV) cable.

The storage unit 1650 may store various programs for signal processing and control in the control unit 1630 and may store signal-processed video, audio, or data signals.

Figure 17:
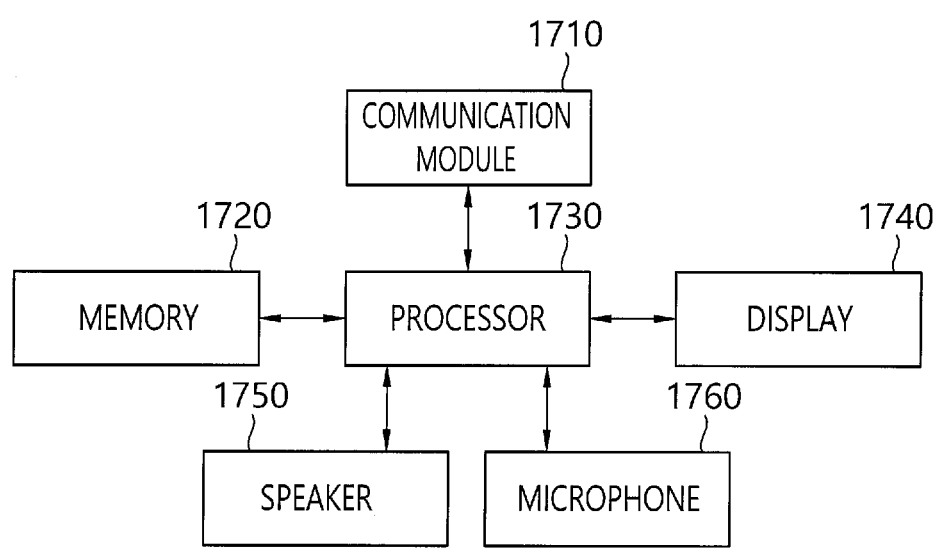
FIG. 17 is a block diagram illustrating a configuration of a terminal apparatus according to another embodiment of the present invention.

FIG. 17 is a block diagram illustrating a configuration of a terminal apparatus according to another embodiment of the present invention.

Referring to FIG. 17, a terminal apparatus may include a communication module 1710, a memory 1720, a processor 1730, a display 1740, a speaker 1750, and a microphone 1760.

The communication module 1710 may communicate with other apparatuses by using various communication schemes. For example, the communication module 1710 may transmit and receive a wireless signal with at least one of a base station, an external terminal apparatus, and a server on a mobile communication network and communicate with the watermark embedding apparatus, the image display apparatus, and the like.

In addition, the communication module 1710 may communicate with other devices via the network.

The memory 1720 stores data supporting various functions of the terminal apparatus. The memory 1720 may store a plurality of application programs or applications driven in the terminal apparatus and data and commands for operating the terminal apparatus.

The processor 1730 may control an overall operation of the terminal apparatus. For example, the processor 1730 may perform related control and processing for voice call, data communication, video call, and the like of the terminal apparatus.

In addition, the processor 1730 may acquire watermark information included in the acquired video or audio and acquire various information such as additional information, pairing information, and identification information corresponding to the acquired watermark information.

The display 1740 may output various images.

Further, the display 1740 may include a touch sensor which recognizes a touch input.

The speaker 1750 may output an audio based on the audio signal processed in the processor 1730.

The microphone 1760 may receive an external acoustic signal by the microphone to process the received acoustic signal to electrical voice data.

FIGS. 18A and 18B are flowcharts illustrating an operation method of a watermark embedding system according to another embodiment of the present invention.

Referring to FIGS. 18A and 18B, a watermark embedding apparatus 1810 may receive a signal (S1810). In this case, the signal includes a broadcast signal or a content signal. For example, the watermark embedding apparatus 1810 may receive a broadcast signal for at least one content or broadcast channel provided in the content providing server from the content distribution server. Alternatively, the watermark embedding apparatus 1810 may receive a broadcast signal provided from the additional service server.

The watermark embedding apparatus 1810 may embed a watermark including unique recognition information to the received content or broadcast signal (S1812). For example, the control unit of the watermark embedding apparatus 1810 may process the received broadcast signal to a video signal and an audio signal and embed a watermark to at least one of the processed video signal and audio signal.

Specifically, the control unit of the watermark embedding apparatus 1810 may embed a watermark including unique recognition information of the watermark embedding apparatus 1810 into a voice signal according to the received broadcast or content signal.

The watermark embedding apparatus 1810 may transmit the output signal embedded with the watermark to the image display apparatus 1820 (S1814). Herein, the output signal may mean a signal for outputting at least one of the video and the audio. For example, the output signal may be at least one of a video signal and an audio signal processed according to the broadcast or content signal.

As an example, the watermark embedding apparatus 1810 may transmit an output signal including the audio signal embedded with the watermark to the image display apparatus 1820 through the output unit.

The image display apparatus 1820 may output the video and the audio according to the transmitted output signal (S1816).

The image display apparatus 1820 may output at least one of the video signal and the audio signal included in the transmitted output signal, and at least one of the output video and audio may include a watermark embedded by the watermark embedding apparatus 1810.

As an example, the image display apparatus 1820 may output the audio signal included in the transmitted output signal to the audio and a watermark may be included in the output audio.

The terminal apparatus 1830 may acquire the audio output from the image display apparatus 1820 (S1818). The terminal apparatus 1830 may extract watermark information for the watermark included in the audio from the acquired audio (S1820).

For example, the terminal apparatus 1830 may acquire the audio output from the image display apparatus 1820 through the microphone and extract the watermark information on the watermark included in the acquired audio.

Meanwhile, the terminal apparatus 1830 may acquire an image output from the image display apparatus 1820 through a camera (not illustrated) and may extract watermark information on a watermark included in the acquired image.

The terminal apparatus 1830 may request additional information corresponding to the extracted watermark information to the paring management server 1840 (S1822).

For example, the terminal apparatus 1830 may transmit an additional information request signal including the extracted watermark information to the paring management server 1840. Herein, the additional information may include information regarding broadcast services and contents related with the output video or audio and may include various goods and advertisement information. In addition, the information regarding the broadcast service may include electronic program guide information of the broadcast service.

The pairing management server 1840 may retrieve unique recognition information corresponding to the request according to the additional information request (S1824).

For example, the pairing management server 1840 may retrieve the unique recognition information of the watermark embedding apparatus 1810 based on the watermark information included in the additional information request. For example, the pairing management server 1840 may retrieve a set-top box identification (ID) of the watermark embedding apparatus 1810 based on the watermark information.

The pairing management server 1840 may request additional information corresponding to the retrieved unique recognition information to the additional service information server 1850 (S1826). Herein, the additional service information server 1850 may be a server including at least one of the additional service management server 1550 and the additional service server 1560 described above (see FIG. 15).

The additional service information server 1850 may retrieve additional information corresponding to the requested unique recognition information (S1828).

For example, the additional service information server 1850 may retrieve additional information according to the channel information or the content information corresponding to the requested unique recognition information of the watermark embedding apparatus 1810. Accordingly, the additional service information server 1850 may retrieve information regarding a broadcast service or content related to the video or audio output from the image display apparatus 1820 and retrieve various good and advertisement information related with the broadcast service or content related to the output video or audio.

The additional service information server 1850 may transmit the retrieved additional information to the terminal apparatus 1830 (S1830).

The additional service information server 1850 may also transmit the retrieved additional information to the terminal apparatus 1830 via the pairing management server 1840.

The terminal apparatus 1830 may output the transmitted additional information (S1832). For example, the terminal apparatus 1830 may display the transmitted additional information through the display and output audio through the speaker.

Meanwhile, the additional service information server 1850 may transmit the retrieved additional information to the image display apparatus 1820. Accordingly, the image display apparatus 1820 may also output the transmitted additional information.

According to the embodiment of the present invention, the watermark embedding system may pair the watermark embedding apparatus and the terminal apparatus to communicate with each other by using pairing information included in the embedded watermark.

Figure 19:
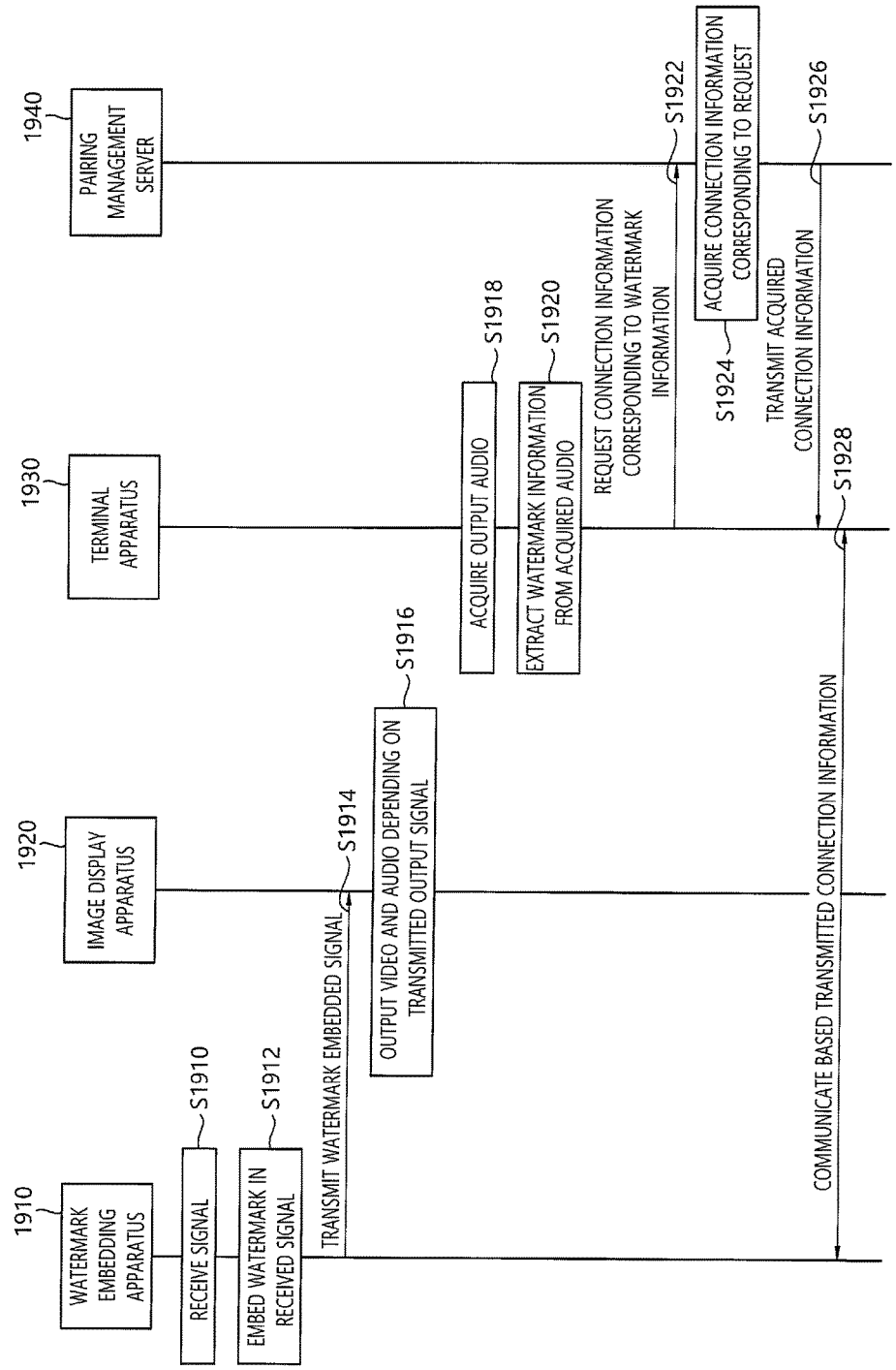
FIG. 19 is a flowchart illustrating an operation method of a watermark embedding system according to yet another embodiment of the present invention.

FIG. 19 is a flowchart illustrating an operation method of a watermark embedding system according to yet another embodiment of the present invention.

Referring to FIG. 19, a watermark embedding apparatus 1910 may receive a broadcast signal and/or a content signal (S1910).

For example, the watermark embedding apparatus 1910 may receive a broadcast signal for at least one content or broadcast channel provided in the content providing server from the content distribution server.

The watermark embedding apparatus 1910 may embed a watermark for recognize unique recognition information in the received signal (S19512). Herein, the unique recognition information may include the watermark embedding apparatus 1910, for example, a set-top box identification (ID) and also include paring information for paring with the watermark embedding apparatus.

For example, the control unit of the watermark embedding apparatus 1910 may process the received broadcast signal or content signal to a video signal and an audio signal and embed a watermark in at least one of the processed video signal and audio signal.

Specifically, the control unit of the watermark embedding apparatus 1910 may embed a watermark including unique recognition information of the watermark embedding apparatus 1910 into the audio signal included in the received broadcast signal or content signal.

The watermark embedding apparatus 1910 may transmit an output signal embedded with the watermark to the image display apparatus 1920 (S1914). Herein, the output signal may mean a signal for outputting at least one of the video and the audio by the image display apparatus 1920. For example, the output signal may be at least one of a video signal and an audio signal processed according to the broadcast signal.

As an example, the watermark embedding apparatus 1910 may transmit an output signal including the audio signal embedded with the watermark to the image display apparatus 1920 through the output unit.

The image display apparatus 1920 may output the video and the audio according to the transmitted output signal (S1916).

The image display apparatus 1920 may output at least one of the video signal and the audio signal included in the transmitted output signal, and at least one of the output video and audio may include a watermark embedded by the watermark embedding apparatus 1910.

As an example, the image display apparatus 1920 may output the audio signal included in the transmitted output signal to the audio and a watermark may be included in the output audio.

The terminal apparatus 1930 may acquire the audio output from the image display apparatus 1920 (S1918). The terminal apparatus 1930 may extract watermark information for the watermark included in the audio from the acquired audio (S1920).

For example, the terminal apparatus 1930 may acquire the audio output from the image display apparatus 1920 through the microphone and extract the watermark information on the watermark included in the acquired audio.

Alternatively, the terminal apparatus 1930 may acquire an image output from the image display apparatus 1920 through a camera (not illustrated) and may extract watermark information on a watermark included in the acquired image.

The terminal apparatus 1930 may request pairing information corresponding to the extracted watermark information to the paring management server 1930 (S1922). In addition, the terminal apparatus 1930 may transmit a pairing information request signal including the extracted watermark information to the paring management server 1940. Herein, the pairing information may mean information required for pairing so that the terminal apparatus 1930 and the watermark embedding apparatus 1910 communicate with each other.

The pairing management server 1940 may acquire pairing information corresponding to the request according to the pairing information request (S1924).

For example, the pairing management server 1940 may retrieve unique recognition information of the watermark embedding apparatus 1910 based on the watermark information included in the pairing information request. In addition, the pairing management server 1940 may acquire pairing information based on the retrieved unique recognition information. As an example, the pairing management server 1940 may retrieve unique recognition information, for example a set-top box identification (ID) of the watermark embedding apparatus 1910 based on the watermark information. In addition, the pairing management server

1940 may acquire pairing information corresponding to the retrieved unique recognition information.

As another example, the pairing management server 1940 may also acquire pairing information from the watermark information on the watermark included in the transmitted pairing information request.

Meanwhile, the pairing management server 1940 may also acquire pairing information corresponding to the unique recognition information from other apparatuses or other servers by using the unique recognition information of the watermark embedding apparatus 1910.

The pairing management server 1940 may transmit the acquired pairing information to the terminal apparatus 1930 (S1926).

The terminal apparatus 1930 may communicate with the watermark embedding apparatus 1910 based on the transmitted pairing information (S1928).

The terminal apparatus 1930 may perform a pairing operation for communicating with the watermark embedding apparatus 1910 based on the transmitted pairing information. In addition, the terminal apparatus 1930 may communicate with the watermark embedding apparatus 1910 in order to perform various operations or various functions after the pairing operation of the watermark embedding apparatus 1910. For example, the terminal apparatus 1930 may perform data communication with the paired watermark embedding apparatus 1910.

The watermark embedding system according to the embodiment of the present invention may provide additional information regarding the contents output from the image display apparatus by using the channel information included in the embedded watermark.

FIG. 20 is a flowchart illustrating an additional information providing method according to an embodiment of the present invention.

Referring to FIG. 20, a watermark embedding apparatus 2010 may receive a broadcast signal or a content signal (S1910).

For example, the watermark embedding apparatus 2010 may receive a broadcast signal for at least one content or broadcast channel provided in the content providing server from the content distribution server.

The watermark embedding apparatus 2010 may embed a watermark including channel recognition information which is unique recognition information of the broadcast channel according to the received broadcast signal or content signal (S2012).

For example, the control unit of the watermark embedding apparatus 2010 may process the received broadcast signal or content signal to a video signal and an audio signal and embed a watermark including the channel recognition information which is the unique recognition information of the broadcast channel in at least one of the processed video signal and audio signal.

Specifically, the control unit of the watermark embedding apparatus 2010 may embed a watermark including the channel recognition information which is the unique recognition information of the broadcast channel in the audio signal included in the received broadcast signal or content signal. Accordingly, the control unit of the watermark embedding apparatus 2010 may embed a watermark including the channel recognition information on each of the plurality of broadcast channels in the audio signal of the selected broadcast signal. Herein, the selected broadcast signal may be a broadcast signal corresponding to the broadcast channel output from an image display apparatus 2020.

The watermark embedding apparatus 2010 may transmit an output signal embedded with the watermark to the image display apparatus 2020 (S2014). Herein, the output signal may mean a signal for outputting at least one of the video and the audio by the image display apparatus 2020. For example, the output signal may be at least one of a video signal and an audio signal processed according to the broadcast signal or the content signal.

As an example, the watermark embedding apparatus 2010 may transmit an output signal including the audio signal embedded with the watermark to the image display apparatus 2020 through the output unit.

The image display apparatus 2020 may output a video and an audio according to the transmitted output signal (S2016).

The image display apparatus 2020 may output at least one of the video signal and the audio signal included in the transmitted output signal, and at least one of the output video and audio may include a watermark embedded by the watermark embedding apparatus 2010.

As an example, the image display apparatus 2020 may output the audio signal included in the transmitted output signal to the audio and a watermark may be included in the output audio.

A terminal apparatus 2030 may acquire the audio output from the image display apparatus 2020 (S2018). The terminal apparatus 2030 may extract watermark information for the watermark included in the audio from the acquired audio (S2020).

For example, the terminal apparatus 2030 may acquire the audio output from the image display apparatus 2020 through the microphone and extract the watermark information on the watermark included in the acquired audio.

Meanwhile, the terminal apparatus 2030 may acquire an image output from the image display apparatus 2020 through a camera (not illustrated) and may extract watermark information on a watermark included in the acquired image.

The terminal apparatus 2030 may acquire channel information corresponding to the extracted watermark information (S2022).

Herein, the channel information may mean information on the broadcast channel corresponding to at least one of the video and the audio.

For example, the terminal apparatus 2030 may acquire channel information from the extracted watermark information.

As another example, the terminal apparatus 2030 may also acquire channel information from other apparatuses or other servers by using the extracted watermark information.

The terminal apparatus 1830 may request additional information corresponding to the acquired channel information to an additional service information server 2040 (S2024).

Herein, the additional information may include information regarding broadcast services and contents related with the output video or audio and may include various goods and advertisement information. In addition, the information regarding the broadcast service may include electronic program guide information of the broadcast service.

The additional service information server 2040 may acquire additional information by using the channel information and the EPG information according to the additional information request (S2026).

The additional service information server 2040 may retrieve a broadcast channel matched with the channel information included in the additional information request based on the EPG information including information on a plurality of broadcast channels. In addition, the additional service information server 2040 may acquire additional information on the retrieved broadcast channel.

The additional service information server 2040 may transmit the retrieved additional information to the terminal apparatus 2030 (S2028).

The terminal apparatus 2030 may output the transmitted additional information (S2030).

For example, the terminal apparatus 2030 may display the transmitted additional information through the display and output audio through the speaker.

Meanwhile, the additional service information server 2040 may transmit the retrieved additional information to the image display apparatus 2020. Accordingly, the image display apparatus 2020 may also output the transmitted additional information.

While the invention has been shown and described with respect to the preferred embodiments, it will be understood by those skilled in the art that various changes and modifications may be made without departing from the spirit and scope of the invention as defined in the following claims.

What is claimed is:

1. A watermark embedding method, comprising:
receiving an original image;
selecting a watermark pattern to be embedded in the original image;
generating a watermark image based on the watermark pattern;
generating an alpha blended stego image by alpha blending the original image and the watermark image; and
providing the alpha blended stego image,
wherein the watermark image is generated by calculating at least one of allowable minimum and maximum alpha value α and allowable minimum and maximum pixel value of the watermark pattern applied to a first pixel of the original image using a first alpha blending rule,
wherein the at least one of allowable minimum and maximum alpha value α and allowable minimum and maximum pixel value is determined by a difference d of pixel value of the first pixel between the original image and the alpha blended stego image by embedding the watermark pattern to the first pixel,
wherein the first alpha blending rule is generated based on statistical values by analyzing all of cases where the watermark pattern has pixel values of a minimum pixel value to a maximum pixel value with respect to a pixel value of the watermark pattern for all pixel value applicable to the first pixel of the original image when the difference d is defined as an invariable value, and
wherein the watermark image is generated by determining the pixel value of the watermark pattern and an alpha value α,
wherein the pixel value of the watermark pattern and the alpha value α are determined based on the at least one of allowable minimum and maximum alpha value α and allowable minimum and maximum pixel value of the watermark pattern, and
wherein the allowable minimum and maximum pixel value of the watermark pattern is calculated based on the watermark pattern without using pixel values of pixels in the original image.

2. The watermark embedding method of claim 1, wherein in a relationship with a correlation pixel having a temporal-spatial correlation with the first pixel, the watermark image is generated by calculating the at least one of allowable minimum and maximum alpha value α and allowable minimum and maximum pixel value of the watermark pattern applied to the first pixel using a second alpha blending rule,
wherein a subtraction values d1–d2 is defined as a subtraction value between a difference d1 in pixel value between the first pixel and the correlation pixel in the original image and a difference d2 in pixel value between the first pixel and the correlation pixel in the alpha blended stego image, by embedding the watermark pattern to the first pixel, and
wherein the second alpha blending rule is generated based on statistical values by analyzing all of cases where the watermark pattern has pixel values of a minimum pixel value to a maximum pixel value with respect to the pixel value of the watermark pattern for all pixel value applicable to the first pixel and the correlation pixel of the original image when the subtraction values d1–d2 is defined as an invariable value.

3. The watermark embedding method of claim 2, wherein when considering a first correlation pixel and a second correlation pixel temporal-spatially correlated with the first pixel, the watermark image is generated based on the pixel value of the watermark pattern and the alpha value which simultaneously satisfy:
(i) the at least one of allowable minimum and maximum alpha value α and allowable minimum and maximum pixel value of the watermark pattern applied to the first pixel based on a first subtraction values of the pixel value difference between the first pixel and the first correlation pixel by embedding the watermark pattern in the first pixel; and
(ii) the at least one of allowable minimum and maximum alpha value α and allowable minimum and maximum pixel value of the watermark pattern applied to the first pixel based on a second subtraction values of the pixel value difference between the first pixel and the second correlation pixel by embedding the watermark pattern in the first pixel.

4. The watermark embedding method of claim 2, wherein the difference d or the subtraction values d1–d2 according to the embedding of the watermark pattern is selected as the largest difference value among a plurality of the difference d or the subtraction values d1–d2 when the difference d or the subtraction values d1–d2 are plural.

5. The watermark embedding method of claim 2, wherein the difference d or the subtraction values d1–d2 according to the embedding of the watermark pattern is acquired based on the difference value d calculated by analyzing cases of all watermark pattern values which are applicable to an original image pixel value.

6. The watermark embedding method of claim 2, wherein the allowable minimum and maximum alpha value α and allowable minimum and maximum pixel value based on the difference d or the subtraction values d1–d2 according to the embedding of the watermark pattern is calculated based on an alpha blending map which defines the at least one of the allowable minimum and maximum alpha value α and allowable minimum and maximum pixel value changed with the correlation as the pixel value of the original image is changed in response to the difference d or the subtraction values d1–d2.

7. The watermark embedding method of claim 5, wherein the alpha blending map is implemented by at least one of equations, tables, and graphs.

8. The watermark embedding method of claim 5, wherein the alpha blending map is predetermined.

9. The watermark embedding method of claim 6, wherein the alpha blending map is implemented by including at least one graph line representing the allowable minimum and maximum of alpha value α and the allowable minimum and maximum pixel value of the watermark pattern according to the difference d or the subtraction values d1–d2.

10. The watermark embedding method of claim 9, wherein the alpha blending map comprises the at least one graph line expressed by defining the difference d or the subtraction values d1–d2 as a specific interval, and wherein the allowable minimum and maximum pixel value of the watermark pattern according to the difference value d or the subtraction values d1–d2 which is not included in the specific interval is calculated by using a distance from the at least one graph line.

11. The watermark embedding method of claim 1, wherein each pixel of the watermark pattern has a value expressed by a number, and wherein each pixel of the watermark pattern is classified into one of a higher value than an average value of all pixels of the watermark pattern and a lower value than the average.

12. The watermark embedding method of claim 1, wherein a pattern value of the watermark pattern has a weight, and wherein the difference value d or the subtraction values d1–d2 is changed according to the weight.

13. A watermark embedding apparatus, comprising:
a processor configured to:
receive a current input image;
select a watermark pattern to be embedded in the current input image;
generate a watermark image based on the watermark pattern;
generate an alpha blended stego image by alpha blending the current input image and the watermark image; and
provide the alpha blended stego image,
wherein the processor generates the watermark image by calculating at least one of allowable minimum and maximum alpha value α and allowable minimum and maximum pixel value of the watermark pattern applied to a first pixel of the original image,
wherein the at least one of allowable minimum and maximum alpha value α and allowable minimum and maximum pixel value are determined by a difference d of pixel value of the first pixel by between the original image and the alpha blended stego image by embedding the watermark pattern to the first pixel, wherein the first alpha blending rule is generated based on statistical values by analyzing all of cases where the watermark pattern has pixel values of a minimum pixel value to a maximum pixel value with respect to a pixel value of the watermark pattern for all pixel value applicable to the first pixel of the original image when the difference d is defined as an invariable value, and wherein the watermark image is generated by determining the pixel value of the watermark pattern and an alpha value α, wherein the pixel value of the watermark pattern and the alpha value α are determined based on the at least one of allowable minimum and maximum alpha value α and allowable minimum and maximum pixel value of the watermark pattern, and wherein the allowable minimum and maximum pixel value of the watermark pattern is calculated based on the watermark pattern without using pixel values of pixels in the original image.

14. The watermark embedding method apparatus of claim 13, wherein in a relationship with a correlation pixel having a temporal-spatial correlation with the first pixel, the processor generates the watermark image by calculating the at least one of minimum and maximum alpha value α and minimum and maximum pixel value of the watermark applied to the first pixel using a second alpha blending rule, wherein a subtraction values d1–d2 is defined as a subtraction value between a difference d1 in pixel value between the first pixel and the correlation pixel in the original image and a difference d2 in pixel value between the first pixel and the correlation pixel in the alpha blended stego image, by embedding the watermark pattern to the first pixel, and wherein the second alpha blending rule is generated based on statistical values by analyzing all of cases where the watermark pattern has pixel values of the minimum pixel value to the maximum pixel value with respect to the pixel value of the watermark pattern for all pixel value applicable to the first pixel and the correlation pixel of the original image when the subtraction values d1–d2 is defined as an invariable value.

* * * * *